(12) United States Patent
Park et al.

(10) Patent No.: US 9,444,289 B2
(45) Date of Patent: Sep. 13, 2016

(54) WIRELESS POWER SYSTEM AND RESONANT FREQUENCY CHANGING METHOD THEREOF

(75) Inventors: Yongcheol Park, Gyeonggi-Do (KR); Seonghun Lee, Seoul (KR); Taewook Kwon, Seoul (KR); Jeongkyo Seo, Gyeonggi-Do (KR); Jaesung Lee, Gyeonggi-Do (KR)

(73) Assignee: LG ELECTRONICS INC., Seoul (KR)

( * ) Notice: Subject to any disclaimer, the term of this patent is extended or adjusted under 35 U.S.C. 154(b) by 945 days.

(21) Appl. No.: 13/606,848

(22) Filed: Sep. 7, 2012

(65) Prior Publication Data

US 2013/0062961 A1    Mar. 14, 2013

Related U.S. Application Data

(60) Provisional application No. 61/533,011, filed on Sep. 9, 2011.

(51) Int. Cl.
*H01F 27/42* (2006.01)
*H02J 17/00* (2006.01)

(52) U.S. Cl.
CPC .................................. *H02J 17/00* (2013.01)

(58) Field of Classification Search
USPC ........................................................ 307/104
See application file for complete search history.

(56) References Cited

U.S. PATENT DOCUMENTS

2012/0153893 A1*   6/2012   Schatz et al. ................. 320/108

* cited by examiner

*Primary Examiner* — Rexford Barnie
*Assistant Examiner* — Dru Parries
(74) *Attorney, Agent, or Firm* — Birch, Stewart, Kolasch & Birch, LLP

(57) ABSTRACT

This specification provides a wireless power system capable of changing a resonant frequency and a resonant frequency changing method thereof. To this end, a wireless power receiver according to one exemplary embodiment includes a power receiving unit having a receiving side resonant circuit provided with at least one inductor and at least one capacitor, and configured to receive a wireless power signal, the wireless power signal being generated based on a resonance phenomenon between the receiving side resonant circuit and a transmitting side resonant circuit of a wireless power transmitter, and a power reception control unit configured to control the power receiving unit to change a connection between the at least one inductor and the at least one capacitor so as to change a resonant frequency corresponding to the wireless power signal.

16 Claims, 21 Drawing Sheets

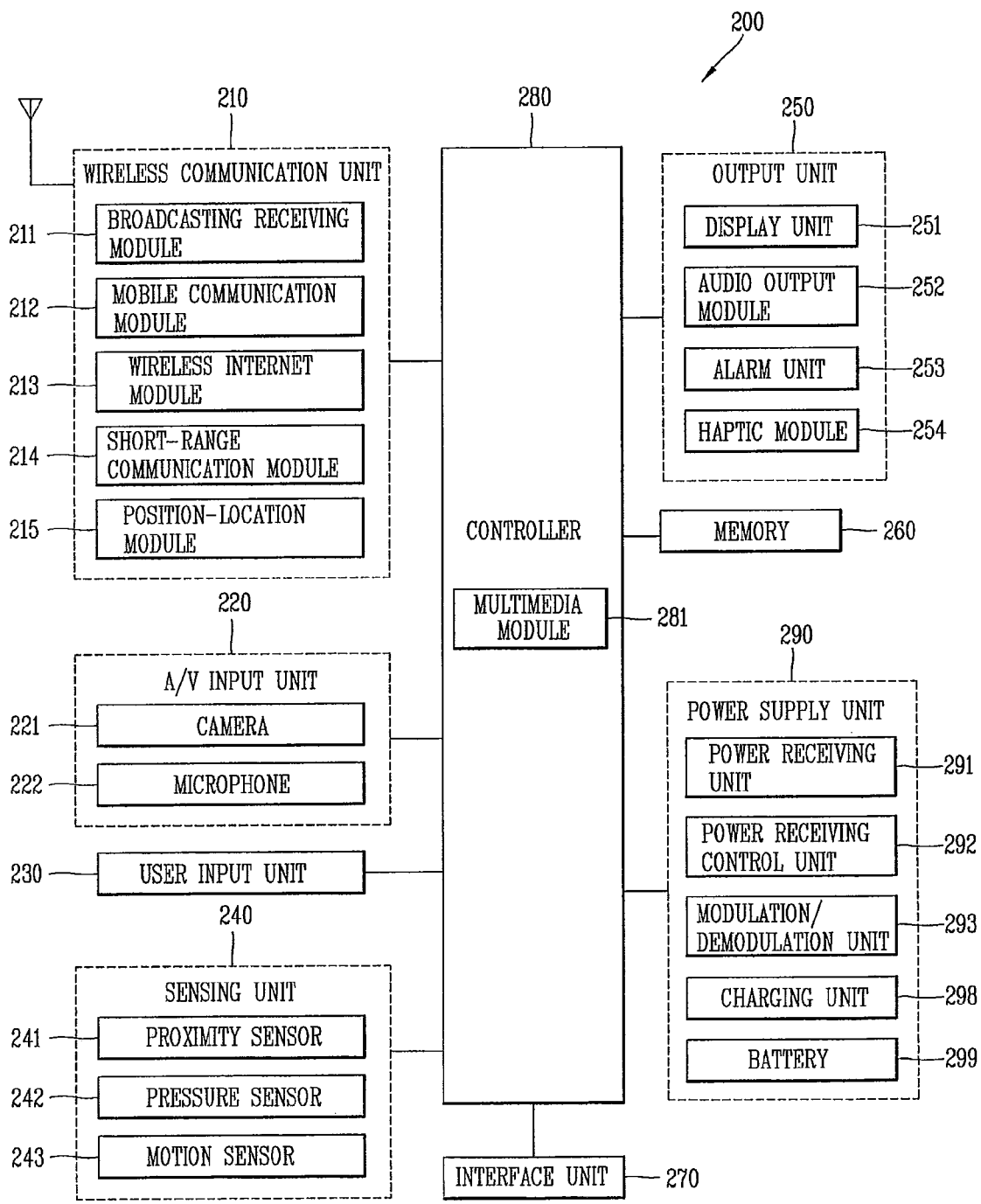

FIG. 16A

| | b7 | b6 | b5 | b4 | b3 | b2 | b1 | b0 | |
|---|---|---|---|---|---|---|---|---|---|
| B0 | HEADER(5220) | | | | | | | | |
| B1 | MAJOR VERSION (5231) | | | | MINOR VERSION (5232) | | | | |
| B2 | MANUFACTURER CODE(5233) | | | | | | | | |
| B3 | | | | | | | | | |
| B4 | EXT (5234) | BASIC DEVICE IDENTIFIER(5235) | | | | | | | |
| ⋮ | | | | | | | | | |
| B7 | | | | | | | | | |

| | b7 | b6 | b5 | b4 | b3 | b2 | b1 | b0 |
|---|---|---|---|---|---|---|---|---|
| B0 | HEADER(5320) | | | | | | | |
| B1 | EXTENDED DEVICE IDENTIFIER(5330) | | | | | | | |
| ⋮ | | | | | | | | |
| B8 | | | | | | | | |

|    | b7 | b6 | b5 | b4 | b3 | b2 | b1 | b0 |
|----|----|----|----|----|----|----|----|----|
| B0 | HEADER (5620) ||||||||
| B1 | END POWER TRANSFER CODE (5630) ||||||||

5600

FIG. 27
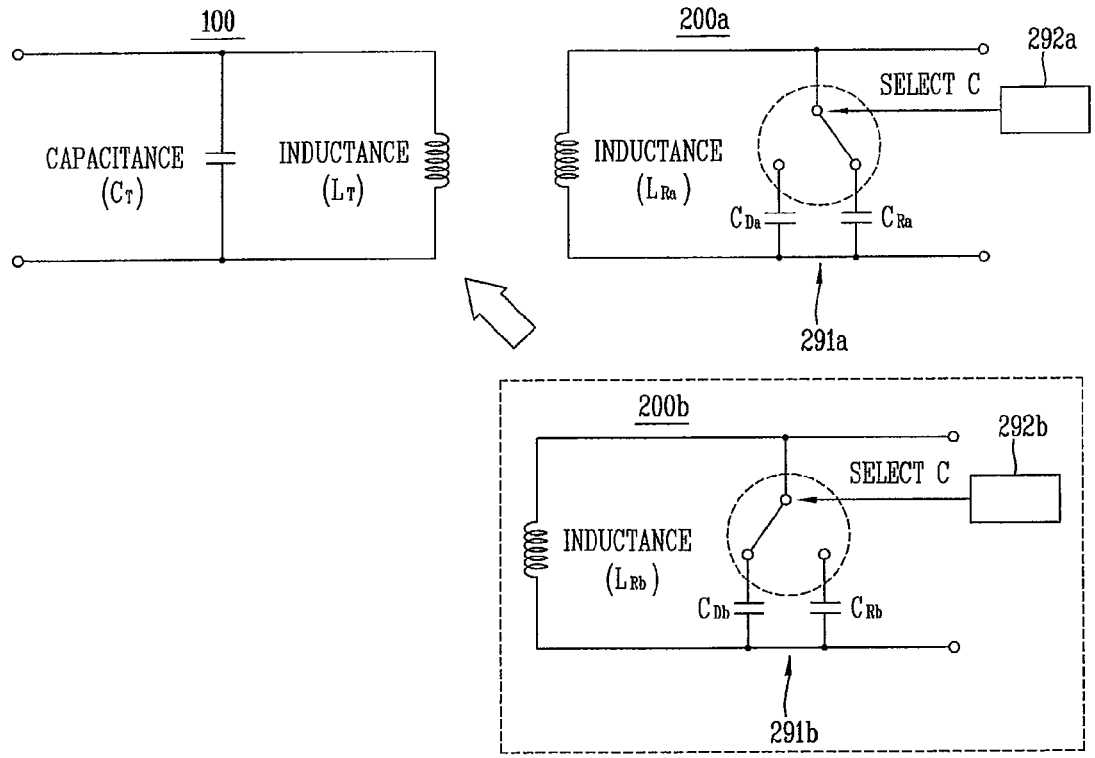
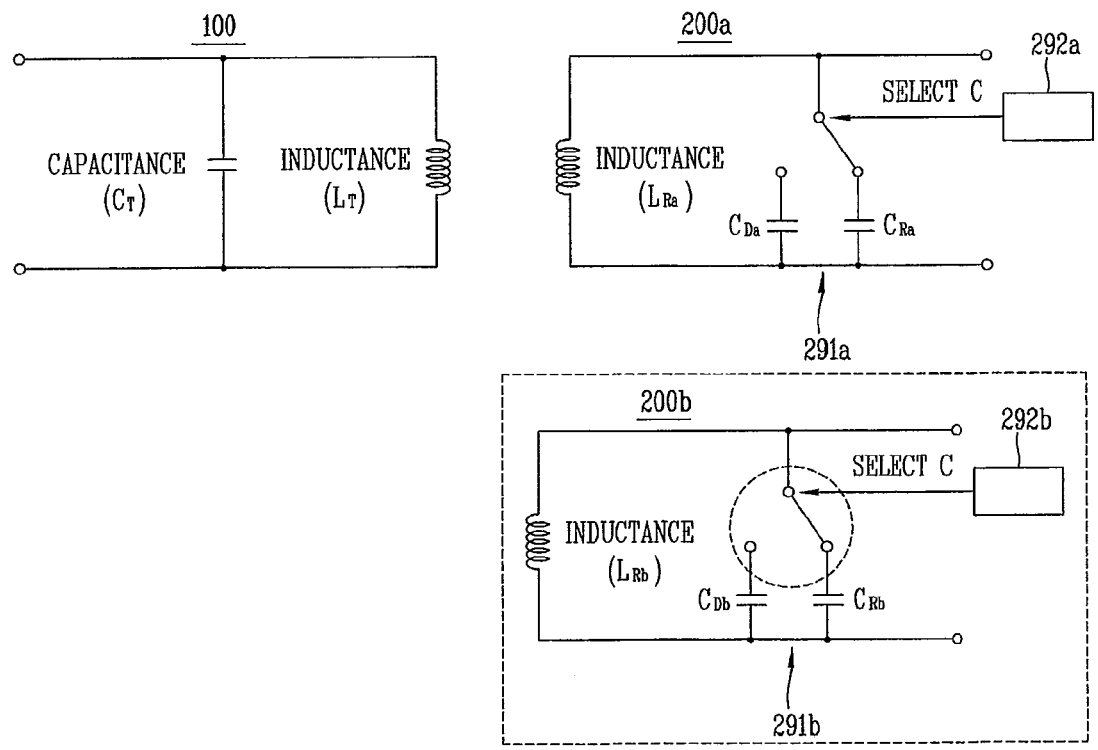

WIRELESS POWER SYSTEM AND RESONANT FREQUENCY CHANGING METHOD THEREOF

RELATED APPLICATION

Pursuant to 35 U.S.C. §119(e), this application claims the benefit of earlier filing date and right of priority to U.S. Provisional Application No. 61/533,011, filed on Sep. 9, 2011, the contents of which is incorporated by reference herein in its entirety.

BACKGROUND OF THE INVENTION

1. Field of the Invention

The present disclosure relates to wireless charging, and more particularly, wireless charging according to a charging characteristic.

2. Description of the Related Art

In recent years, the method of contactlessly supplying electrical energy to electronic devices in a wireless manner has been used instead of the traditional method of supplying electrical energy in a wired manner. The electronic device receiving energy in a wireless manner may be directly driven by the received wireless power, or a battery may be charged by using the received wireless power, then allowing the electronic device to be driven by the charged power.

SUMMARY OF THE INVENTION

Therefore, an aspect of this specification is to provide a wireless power system capable of changing (shifting) a resonant frequency and a resonant frequency changing method thereof.

In accordance with the embodiments disclosed herein, there is provided a wireless power receiver including a power receiving unit having a receiving side resonant circuit provided with at least one inductor and at least one capacitor, and configured to receive a wireless power signal, the wireless power signal being generated based on a resonance phenomenon between the receiving side resonant circuit and a transmitting side resonant circuit of a wireless power transmitter, and a power reception control unit configured to control the power receiving unit to change a connection between the at least one inductor and the at least one capacitor so as to change a resonant frequency corresponding to the wireless power signal.

In one aspect of the present disclosure, the power receiving unit may include an inductor part having n inductors, a switching part having n switching devices, and a capacitor. Here, the power reception control unit may control the power receiving unit to selectively connect at least one of the n inductors to the capacitor in series in response to a switching operation of the switching device.

In one aspect of the present disclosure, the power receiving unit may include a first capacitor, a second capacitor, an inductor, and a switching device. Here, the power reception control unit may control the power receiving unit to selectively connect one of the first capacitor and the second capacitor to the inductor in response to a switching operating of the switching device so as to change a resonant frequency corresponding to the wireless power signal.

In one aspect of the present disclosure, the power reception control unit may control the power receiving unit to connect one of the first capacitor and the second capacitor to the inductor in parallel in response to the switching operation of the switching device.

In one aspect of the present disclosure, the first capacitor may be a detection capacitor for the wireless power transmitter to detect the wireless power receiver, and the second capacitor may be a resonance capacitor for wirelessly receiving power transferred based on a resonance phenomenon.

In one aspect of the present disclosure, the power reception control unit may selectively connect the first capacitor to the inductor when the wireless power receiver meets a specific condition. Also, the power reception control unit may selectively connect the second capacitor to the inductor when a receiving side voltage of the wireless power receiver is close to a reference voltage within a specific error range after the wireless power receiver meets the specific condition.

In one aspect of the present disclosure, the reference voltage may be decided based on whether or not it is a voltage which is able to cause damage on the wireless power receiver.

In one aspect of the present disclosure, the wireless power transmitter may generate a wireless power signal based on a carrier signal, and operate in a resonant frequency deciding mode when the wireless power receiver meets the specific condition. Here, the resonant frequency deciding mode may be a mode of sequentially changing power transmitted in a wireless manner based on the wireless power signal by sequentially changing a driving frequency of the carrier signal, and deciding a driving frequency corresponding to the receiving side voltage as a resonant frequency when the receiving side voltage is close to the reference voltage within the specific error range due to the changed wireless power.

In one aspect of the present disclosure, the specific error range may be ±5% of the reference voltage.

In one aspect of the present disclosure, the specific condition may indicate a case where the wireless power receiver is located within a specific area, a case where a new wireless power receiver is located within the specific area, a case where the number of wireless power receivers present within the specific area changes, a case where a position of at least one wireless power receiver present within the specific area changes, or a case of receiving a request periodically or from the wireless power receiver. Here, the specific area may be an area where the wireless power signal passes through or an area where the wireless power receiver can be detected.

In one aspect of the present disclosure, the power reception control unit may control the power receiving unit to transmit a control message to the wireless power transmitter, and the wireless power transmitter may sequentially change the driving frequency based on the transmitted control message.

In one aspect of the present disclosure, the control message may include control error information indicating a voltage difference between the receiving side voltage and the reference voltage.

In one aspect of the present disclosure, the wireless power transmitter may decide whether or not the receiving side voltage is close to the reference voltage within the specific error range based on the control message, and terminate the change of the driving frequency when the receiving side voltage is close to the reference voltage based on the specific error range.

In one aspect of the present disclosure, the wireless power transmitter may change a connection between at least one inductor and at least one capacitor included in the transmitting side resonant circuit to correspond to the change of the resonant frequency corresponding to the wireless power signal when the receiving side voltage is close to the reference voltage within the specific error range.

In accordance with one exemplary embodiment disclosed herein, there is provided a wireless power transmitter including a power conversion unit having a transmitting side resonant circuit provided with at least on inductor and at least one capacitor, and configured to generate a wireless power signal based on a resonance phenomenon between the transmitting side resonant circuit and a receiving side resonant circuit of a wireless power receiver, and a power transmission control unit configured to change a connection between the at least one inductor and the at least one capacitor so as to change a resonant frequency corresponding to the wireless power signal.

In one aspect of the present disclosure, the power conversion unit may generate the wireless power signal based on a carrier signal, and the power transmission control unit may control the power conversion unit to sequentially change a driving frequency of the carrier signal so as to sequentially change power wirelessly transmitted based on the wireless power signal when the wireless power receiver receiving power in a wireless manner based on the wireless power signal meets a specific condition. Also, the power transmission control unit may control the power conversion unit to terminate the sequential change of the driving frequency when a receiving side voltage of the wireless power receiver is close to the reference voltage within the specific error range due to the changed wireless power. The wireless power receiver may include a first capacitor, a second capacitor, an inductor and a switching device. The wireless power receiver may selectively connect the first capacitor to the inductor upon meeting a specific condition, while selectively connecting the second capacitor to the inductor when a receiving side voltage of the wireless power receiver is close to the reference voltage within the specific error range after meeting the specific condition.

In accordance with one exemplary embodiment disclosed herein, there is provided a method for changing a resonant frequency in a wireless power receiver having a receiving side resonant circuit provided with at least one inductor and at least one capacitor, the method including receiving a wireless power signal generated based on a resonance phenomenon between the receiving side resonant circuit and a transmitting side resonant circuit of a wireless power transmitter, and changing a connection between the at least one inductor and the at least one capacitor to change a resonant frequency corresponding to the wireless power signal.

In one aspect of the present disclosure, the receiving side resonant circuit may include a first capacitor, a second capacitor, an inductor and a switching device. Here, the changing of the resonant frequency may include selectively connecting the first capacitor to the inductor when the wireless power receiver meets a specific condition, and selectively connecting the second capacitor to the inductor when a receiving side voltage of the wireless power receiver is close to a reference voltage within a specific error range after the wireless power receiver meets the specific condition.

In accordance with a wireless power system and a resonant frequency changing method thereof according to exemplary embodiments disclosed herein, a resonant frequency of a resonant circuit included in a wireless power receiver or a wireless power transmitter, which constructs the wireless power system, may be adjusted by changing a physical connection between passive devices included in the resonant circuit, resulting in acquiring of high transmission efficiency regardless of changes in wireless power transfer environments.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 10 is view illustrating a configuration in case where an electronic device 200 according to the embodiments disclosed herein is implemented in the form of a mobile terminal;

FIGS. 15 through 19 are views illustrating the structure of packets including a power control message between the wireless power transmitter 100 and electronic device 200;

FIG. 27 is an exemplary view illustrating a resonant frequency changing method by a receiving side resonant circuit in accordance with a third exemplary embodiment;

DETAILED DESCRIPTION OF THE INVENTION

Figure 1:
FIG. 1 is an exemplary view conceptually illustrating a wireless power transmitter and an electronic device according to the embodiments of the present invention.

The technologies disclosed herein may be applicable to wireless power transfer (contactless power transfer). However, the technologies disclosed herein are not limited to this, and may be also applicable to all kinds of power transmission systems and methods, wireless charging circuits and methods to which the technological spirit of the technology can be applicable, in addition to the methods and apparatuses using power transmitted in a wireless manner.

It should be noted that technological terms used herein are merely used to describe a specific embodiment, but not to limit the present invention. Also, unless particularly defined otherwise, technological terms used herein should be construed as a meaning that is generally understood by those having ordinary skill in the art to which the invention pertains, and should not be construed too broadly or too narrowly. Furthermore, if technological terms used herein are wrong terms unable to correctly express the spirit of the invention, then they should be replaced by technological terms that are properly understood by those skilled in the art. In addition, general terms used in this invention should be construed based on the definition of dictionary, or the context, and should not be construed too broadly or too narrowly.

Incidentally, unless clearly used otherwise, expressions in the singular number include a plural meaning. In this application, the terms "comprising" and "including" should not be construed to necessarily include all of the elements or steps disclosed herein, and should be construed not to include some of the elements or steps thereof, or should be construed to further include additional elements or steps.

In addition, a suffix "module" or "unit" used for constituent elements disclosed in the following description is merely intended for easy description of the specification, and the suffix itself does not give any special meaning or function.

Furthermore, the terms including an ordinal number such as first, second, etc. can be used to describe various elements, but the elements should not be limited by those terms. The terms are used merely for the purpose to distinguish an element from the other element. For example, a first element may be named to a second element, and similarly, a second element may be named to a first element without departing from the scope of right of the invention.

Hereinafter, preferred embodiments of the present invention will be described in detail with reference to the accompanying drawings, and the same or similar elements are designated with the same numeral references regardless of the numerals in the drawings and their redundant description will be omitted.

In describing the present invention, moreover, the detailed description will be omitted when a specific description for publicly known technologies to which the invention pertains is judged to obscure the gist of the present invention. Also, it should be noted that the accompanying drawings are merely illustrated to easily explain the spirit of the invention, and therefore, they should not be construed to limit the spirit of the invention by the accompanying drawings.

FIG. 1—Conceptual View of Wireless Power Transmitter and Electronic Device

FIG. 1 is an exemplary view conceptually illustrating a wireless power transmitter and an electronic device according to the embodiments of the present invention.

Referring to FIG. 1, the wireless power transmitter 100 may be a power transfer apparatus configured to transfer power required for the electronic device 200 in a wireless manner.

Furthermore, the wireless power transmitter 100 may be a wireless charging apparatus configured to charge a battery of the electronic device 200 by transferring power in a wireless manner. A case where the wireless power transmitter 100 is a wireless charging apparatus will be described later with reference to FIG. 9.

Additionally, the wireless power transmitter 100 may be implemented with various forms of apparatuses transferring power to the electronic device 200 requiring power in a contactless state.

The electronic device 200 is a device that is operable by receiving power from the wireless power transmitter 100 in a wireless manner. Furthermore, the electronic device 200 may charge a battery using the received wireless power.

On the other hand, an electronic device for receiving power in a wireless manner as described herein should be construed broadly to include a portable phone, a cellular phone, a smart phone, a personal digital assistant (PDA), a portable multimedia player (PMP), a tablet, a multimedia device, or the like, in addition to an input/output device such as a keyboard, a mouse, an audio-visual auxiliary device, and the like.

The electronic device 200, as described later, may be a mobile communication terminal, (for example, a portable phone, a cellular phone, and a tablet or multimedia device). In case where the electronic device is a mobile terminal, it will be described later with reference to FIG. 10.

On the other hand, the wireless power transmitter 100 may transfer power in a wireless manner without mutual contact to the electronic device 200 using one or more wireless power transfer methods. In other words, the wireless power transmitter 100 may transfer power using at least one of an inductive coupling method based on magnetic induction phenomenon by the wireless power signal and a magnetic resonance coupling method based on electromagnetic resonance phenomenon by a wireless power signal at a specific frequency.

Wireless power transfer in the inductive coupling method is a technology transferring power in a wireless manner using a primary coil and a secondary coil, and refers to the transmission of power by inducing a current from a coil to another coil through a changing magnetic field by a magnetic induction phenomenon.

Wireless power transfer in the inductive coupling method refers to a technology in which the electronic device 200 generates resonance by a wireless power signal transmitted from the wireless power transmitter 100 to transfer power from the wireless power transmitter 100 to the wireless power receiver 200 by the resonance phenomenon.

Hereinafter, the wireless power transmitter 100 and electronic device 200 according to the embodiments disclosed herein will be described in detail. In assigning reference numerals to the constituent elements in each of the following drawings, the same reference numerals will be used for the same constituent elements even though they are shown in a different drawing.

Figure 2A:
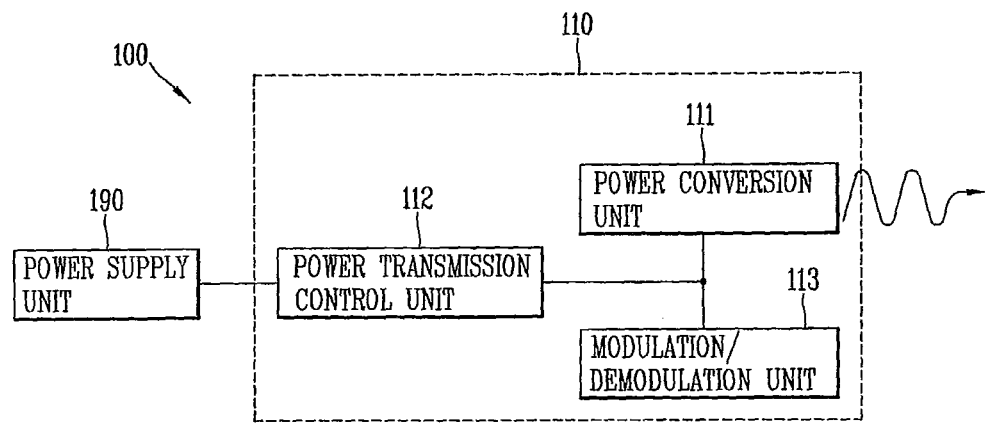
FIGS. 2A and 2B are exemplary block diagrams illustrating the configuration of a wireless power transmitter 100 and an electronic device 200 that can be employed in the embodiments disclosed herein, respectively.
Figure 2B:
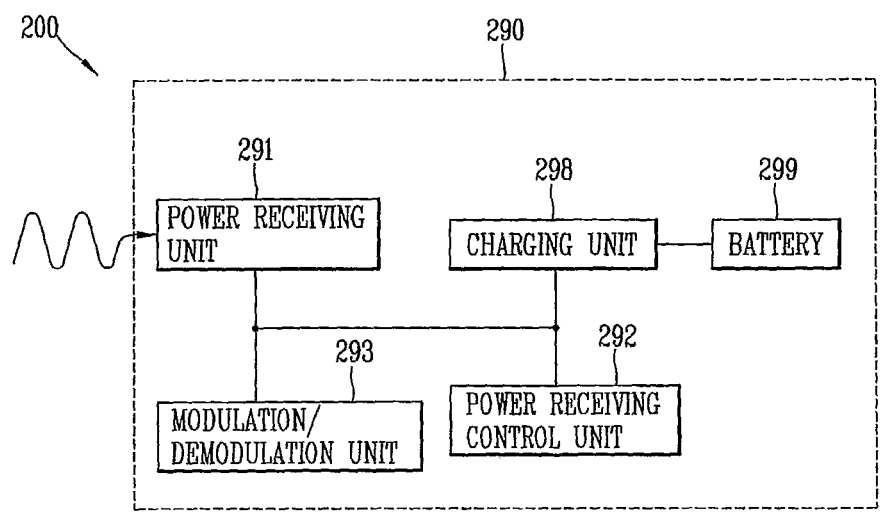

FIGS. 2A and 2B are exemplary block diagrams illustrating the configuration of a wireless power transmitter 100 and an electronic device 200 that can be employed in the embodiments disclosed herein.

FIG. 2A—Wireless Power Transmitter

Referring to FIG. 2A, the wireless power transmitter 100 may include a power transmission unit 110. The power transmission unit 110 may include a power conversion unit 111 and a power transmission control unit 112.

The power conversion unit 111 transfers power supplied from a transmission side power supply unit 190 to the electronic device 200 by converting it into a wireless power signal. The wireless power signal transferred by the power conversion unit 111 is generated in the form of a magnetic field or electromagnetic field having an oscillation characteristic. For this purpose, the power conversion unit 111 may be configured to include a coil for generating the wireless power signal.

The power conversion unit 111 may include a constituent element for generating a different type of wireless power signal according to each power transfer method.

In accordance with exemplary embodiments, the power conversion unit 111 may include a primary coil for forming a changing magnetic field to induce a current to a secondary coil of the electronic device 200. Furthermore, the power conversion unit 111 may include a coil (or antenna) for forming a magnetic field having a specific resonant frequency to generate a resonant frequency in the electronic device 200 according to the resonance coupling method.

Furthermore, the power conversion unit 111 may transfer power using at least one of the foregoing inductive coupling method and the resonance coupling method.

Among the constituent elements included in the power conversion unit 111, those for the inductive coupling method will be described later with reference to FIGS. 4 and 5, and those for the resonance coupling method will be described with reference to FIGS. 7 and 8.

On the other hand, the power conversion unit 111 may further include a circuit for controlling the characteristics of a used frequency, an applied voltage, an applied current or the like to form the wireless power signal.

The power transmission control unit 112 controls each of the constituent elements included in the power transmission unit 110 The power transmission control unit 112 may be implemented to be integrated into another control unit (not shown) for controlling the wireless power transmitter 100.

On the other hand, a region to which the wireless power signal can be approached may be divided into two types. First, an active area denotes a region through which a wireless power signal transferring power to the electronic device 200 is passed. Next, a semi-active area denotes an interest region in which the wireless power transmitter 100 can detect the existence of the electronic device 200. Here, the power transmission control unit 112 may detect whether the electronic device 200 is placed in the active area or detection area or removed from the area. Specifically, the power transmission control unit 112 may detect whether or not the electronic device 200 is placed in the active area or detection area using a wireless power signal formed from the power conversion unit 111 or a sensor separately provided therein. For instance, the power transmission control unit 112 may detect the presence of the electronic device 200 by monitoring whether or not the characteristic of power for forming the wireless power signal is changed by the wireless power signal, which is affected by the electronic device 200 existing in the detection area. However, the active area and detection area may vary according to the wireless power transfer method such as an inductive coupling method, a resonance coupling method, and the like.

The power transmission control unit 112 may perform the process of identifying the electronic device 200 or determine whether to start wireless power transfer according to a result of detecting the existence of the electronic device 200.

Furthermore, the power transmission control unit 112 may determine at least one characteristic of a frequency, a voltage, and a current of the power conversion unit 111 for forming the wireless power signal. The determination of the characteristic may be carried out by a condition at the side of the wireless power transmitter 100 or a condition at the side of the electronic device 200. In exemplary embodiments, the power transmission control unit 112 may decide the characteristic based on device identification information. In another exemplary embodiment, the power transmission control unit 112 may decide the characteristic based on required power information of the electronic device 200 or profile information related to the required power. The power transmission control unit 112 may receive a power control message from the electronic device 200. The power transmission control unit 112 may determine at least one characteristic of a frequency, a voltage and a current of the power conversion unit 111 based on the received power control message, and additionally perform other control operations based on the power control message.

For example, the power transmission control unit 112 may determine at least one characteristic of a frequency, a voltage and a current used to form the wireless power signal according to the power control message including at least one of rectified power amount information, charging state information and identification information in the electronic device 200.

Furthermore, as another control operation using the power control message, the wireless power transmitter 100 may perform a typical control operation associated with wireless power transfer based on the power control message. For example, the wireless power transmitter 100 may receive information associated with the electronic device 200 to be auditorily or visually outputted through the power control message, or receive information required for authentication between devices.

In exemplary embodiments, the power transmission control unit 112 may receive the power control message through the wireless power signal. In other exemplary embodiment, the power transmission control unit 112 may receive the power control message through a method for receiving user data.

In order to receive the foregoing power control message, the wireless power transmitter 100 may further include a modulation/demodulation unit 113 electrically connected to the power conversion unit 111. The modulation/demodulation unit 113 may modulate a wireless power signal that has been modulated by the electronic device 200 and use it to receive the power control message. The method for allowing the power conversion unit 111 to receive a power control message using a wireless power signal will be described later with reference to FIGS. 11 through 13.

In addition, the power transmission control unit 112 may acquire a power control message by receiving user data including a power control message by a communication means (not shown) included in the wireless power transmitter 100.

In accordance with one exemplary embodiment, the wireless power transmitter 100 may supply power to a plurality of electronic devices. Here, collision may occur between wireless power signal which have been modulated by the plurality of electronic devices. Hence, the constituent elements included in the wireless power transmitter 100 may perform various operations to avoid such collision between the modulated wireless power signal.

In one exemplary embodiment, the power conversion unit 111 may convert power supplied from the transmission side power supply unit 190 into a wireless power signal and transfer it to the plurality of electronic devices. For example, the plurality of electronic devices may be two electronic devices, namely, a first electronic device and a second electronic device.

The power conversion unit 111 may generate a wireless power signal for power transmission, and receive a first response signal and a second response signal corresponding to the wireless power signal.

The power transmission control unit 112 may determine whether or not the first and second response signals collide with each other. When the first and second response signals collide with each other according to the determination result, the power transmission control unit 112 may reset the power transmission.

The first and second response signals may be generated by modulating the wireless power signal through the first and second electronic devices.

Through the resetting of the power transmission, the power transmission control unit 112 may control the power conversion unit 111 to sequentially receive the first and second response signals, which are generated to avoid collision with each other.

The sequential reception indicates that the first response signal is received after a first time interval and the second response signal is received after a second time interval within a predetermined response period. The first and second time intervals may be decided based on a value obtained by generating a random number.

The predetermined response period (Tping interval) may be decided to be long enough to include both the first response signal and the second response signal. Also, it may be decided after resetting the power transmission.

In accordance with one exemplary embodiment, occurrence or non-occurrence of the collision may be determined according to whether or not the first and second response signals are decoded using a preset format. The preset format may include a preamble, a header and a message. Whether or not the first and second response signals collide with each other may be determined based on whether or not the first and second response signals are not recoverable due to an error generation in at least one of the preamble, the header and the message caused by the collision.

In accordance with one exemplary embodiment, the power conversion unit 111 may periodically receive a response signal of the first device, which does not collide with a response signal of the second device within a first response period (Tping interval_1). The power transmission control unit may decode the first response signal and the second response signal using a preset format, and determine whether or not the first and second response signals have collided with each other based on whether or not the decoding is performed. Here, the first response signal and the second response signal may be periodically received within a second response period (Tping interval_2). The second response period (Tping interval_2) may be decided long enough to include both the first and second response signals, and be decided after resetting the power transmission.

FIG. 2B—Electronic Device

Referring to FIG. 2B, the electronic device 200 may include a power supply unit 290. The power supply unit 290 supplies power required for the operation of the electronic device 200. The power supply unit 290 may include a power receiving unit 291 and a Power reception control unit (or POWER RECEIVING CONTROL UNIT) 292.

The power receiving unit 291 receives power transferred from the wireless power transmitter 100 in a wireless manner.

The power receiving unit 291 may include constituent elements required to receive the wireless power signal according to a wireless power transfer method. Furthermore, the power receiving unit 291 may receive power according to at least one wireless power transfer method, and in this case, the power receiving unit 291 may include constituent elements required for each method.

First, the power receiving unit 291 may include a coil for receiving a wireless power signal transferred in the form of a magnetic field or electromagnetic field having a vibration characteristic.

For instance, as a constituent element according to the inductive coupling method, the power receiving unit 291 may include a secondary coil to which a current is induced by a changing magnetic field. In exemplary embodiments, the power receiving unit 291, as a constituent element according to the resonance coupling method, may include a coil and a resonant circuit in which resonance phenomenon is generated by a magnetic field having a specific resonant frequency.

In another exemplary embodiments, when the power receiving unit 291 receives power according to at least one wireless power transfer method, the power receiving unit 291 may be implemented to receive power by using a coil, or implemented to receive power by using a coil formed differently according to each power transfer method.

Among the constituent elements included in the power receiving unit 291, those for the inductive coupling method will be described later with reference to FIGS. 4A and 4B, and those for the resonance coupling method with reference to FIGS. 7A and 7B.

On the other hand, the power receiving unit 291 may further include a rectifier and a regulator to convert the wireless power signal into a direct current. Furthermore, the power receiving unit 291 may further include a circuit for protecting an overvoltage or overcurrent from being generated by the received power signal.

The Power reception control unit (or POWER RECEIVING CONTROL UNIT) 292 may control each constituent element included in the power supply unit 290.

Specifically, the Power reception control unit (or POWER RECEIVING CONTROL UNIT) 292 may transfer a power control message to the wireless power transmitter 100. The power control message may instruct the wireless power transmitter 100 to initiate or terminate a transfer of the wireless power signal. Furthermore, the power control message may instruct the wireless power transmitter 100 to control a characteristic of the wireless power signal.

In exemplary embodiments, the Power reception control unit (or POWER RECEIVING CONTROL UNIT) 292 may transmit the power control message through the wireless power signal. In another exemplary embodiment, the Power reception control unit (or POWER RECEIVING CONTROL UNIT) 292 may transmit the power control message through a method for transmitting user data.

In order to transmit the foregoing power control message, the electronic device 200 may further include a modulation/demodulation unit 293 electrically connected to the power receiving unit 291. The modulation/demodulation unit 293, similarly to the case of the wireless power transmitter 100, may be used to transmit the power control message through the wireless power signal. The power communications modulation/demodulation unit 293 may be used as a means for controlling a current and/or voltage flowing through the power conversion unit 111 of the wireless power transmitter 100. Hereinafter, a method for allowing the power communications modulation/demodulation unit 113 or 293 at the side of the wireless power transmitter 100 and at the side of the electronic device 200, respectively, to be used to transmit and receive a power control message through a wireless power signal will be described.

A wireless power signal formed by the power conversion unit 111 is received by the power receiving unit 291. At this time, the Power reception control unit (or POWER RECEIVING CONTROL UNIT) 292 controls the power communications modulation/demodulation unit 293 at the side of the electronic device 200 to modulate the wireless power signal. For instance, the Power reception control unit (or POWER RECEIVING CONTROL UNIT) 292 may perform a modulation process such that a power amount received from the wireless power signal is varied by changing a reactance of the power communications modulation/demodulation unit 293 connected to the power receiving unit 291. The change of a power amount received from the wireless power signal results in the change of a current and/or voltage of the power conversion unit 111 for forming the wireless power signal. At this time, the modulation/demodulation unit 113 at the side of the wireless power transmitter 100 may detect a change of the current and/or voltage to perform a demodulation process.

In other words, the Power reception control unit (or POWER RECEIVING CONTROL UNIT) 292 may generate a packet including a power control message intended to be transferred to the wireless power transmitter 100 and modulate the wireless power signal to allow the packet to be included therein, and the power transmission control unit 112 may decode the packet based on a result of performing the demodulation process of the power communications modulation/demodulation unit 113 to acquire the power control message included in the packet. The detailed method of allowing the wireless power transmitter 100 to acquire the power control message will be described later with reference to FIGS. 11 through 13.

In addition, the Power reception control unit (or POWER RECEIVING CONTROL UNIT) 292 may transmit a power control message to the wireless power transmitter 100 by transmitting user data including the power control message by a communication means (not shown) included in the electronic device 200.

In addition, the power supply unit 290 may further include a charger 298 and a battery 299.

The electronic device 200 receiving power for operation from the power supply unit 290 may be operated by power transferred from the wireless power transmitter 100, or operated by charging the battery 299 using the transferred power and then receiving the charged power. At this time, the Power reception control unit (or POWER RECEIVING CONTROL UNIT) 292 may control the charger 298 to perform charging using the transferred power.

In one exemplary embodiment, the plurality of electronic devices may receive power from the wireless power transmitter 100. Here, collision may occur between wireless power signal which have been modulated by the plurality of electronic devices. Hence, the constituent elements included in the wireless power transmitter 100 may perform various operations to avoid such collision between the modulated wireless power signal.

In one exemplary embodiment, the power receiving unit 291 may receive the wireless power signal for the power transmission from the wireless power transmitter.

Here, the Power reception control unit (or POWER RECEIVING CONTROL UNIT) 292 may control the power receiving unit 291 to transmit a third response signal corresponding to the wireless power signal after a time interval set to a first time within the first response period (Tping interval_1).

In one exemplary embodiment, the Power reception control unit (or POWER RECEIVING CONTROL UNIT) 292 may determine whether or not the power transmission of the wireless power transmitter 100 has been reset due to collision between the modulated wireless power signal, and set the time interval to a second time when the power transmission has been reset according to the determination result.

In one exemplary embodiment, the Power reception control unit (or POWER RECEIVING CONTROL UNIT) 292 may control the power receiving unit 291 to transmit a fourth response signal corresponding to the wireless power signal after the time interval set to the second time within the second response period (Tping interval_2). The second time may be decided by a value obtained by generating a random number. Hereinafter, a wireless power transmitter and an electronic device applicable to the embodiments disclosed herein will be described.

First, a method of allowing the wireless power transmitter to transfer power to the electronic device according to the inductive coupling method will be described with reference to FIGS. 3 through 5.

Figure 3:
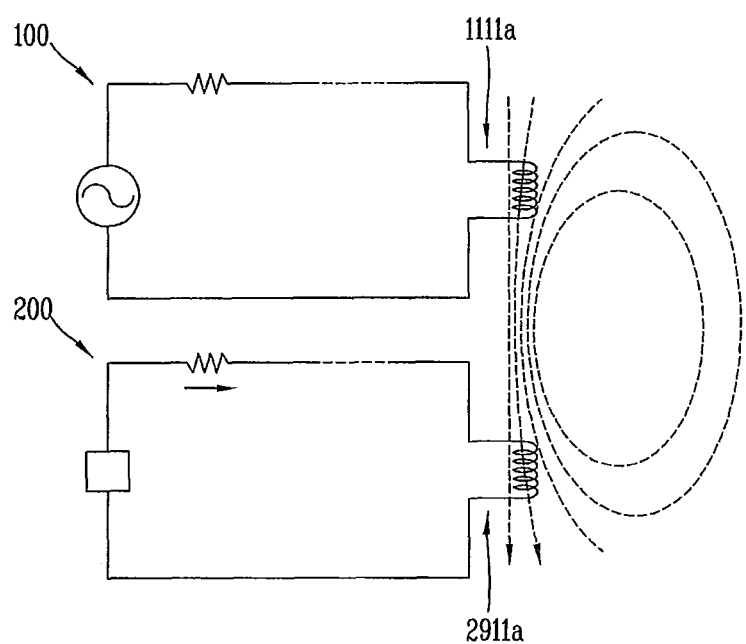
FIG. 3 is a view illustrating a concept in which power is transferred from a wireless power transmitter to an electronic device in a wireless manner according to an inductive coupling method.

FIG. 3—Inductive Coupling Method

FIG. 3 is a view illustrating a concept in which power is transferred from a wireless power transmitter to an electronic device in a wireless manner according to an inductive coupling method.

When the power of the wireless power transmitter 100 is transferred in an inductive coupling method, if the strength of a current flowing through a primary coil within the power transmission unit 110 is changed, then a magnetic field passing through the primary coil will be changed by the current. The changed magnetic field generates an induced electromotive force at a secondary coil in the electronic device 200.

According to the foregoing method, the power conversion unit 111 of the wireless power transmitter 100 may include a transmitting (Tx) coil 1111a being operated as a primary coil in magnetic induction. Furthermore, the power receiving unit 291 of the electronic device 200 may include a receiving (Rx) coil 2911a being operated as a secondary coil in magnetic induction.

First, the wireless power transmitter 100 and electronic device 200 are disposed in such a manner that the transmitting coil 1111a at the side of the wireless power transmitter 100 and the receiving coil at the side of the electronic device 200 are located adjacent to each other. Then, if the power transmission control unit 112 controls a current of the transmitting coil 1111a to be changed, then the power receiving unit 291 controls power to be supplied to the electronic device 200 using an electromotive force induced to the receiving coil 2911a.

The efficiency of wireless power transfer by the inductive coupling method may be little affected by a frequency characteristic, but affected by an alignment and distance between the wireless power transmitter 100 and the electronic device 200 including each coil.

On the other hand, in order to perform wireless power transfer in the inductive coupling method, the wireless power transmitter 100 may be configured to include an interface surface (not shown) in the form of a flat surface. One or more electronic devices may be placed at an upper portion of the interface surface, and the transmitting coil 1111a may be mounted at a lower portion of the interface surface. In this case, a vertical spacing is formed in a small-scale between the transmitting coil 1111a mounted at a lower portion of the interface surface and the receiving coil 2911a of the electronic device 200 placed at an upper portion of the interface surface, and thus a distance between the coils becomes sufficiently small to efficiently implement contactless power transfer by the inductive coupling method.

Furthermore, an alignment indicator (not shown) indicating a location where the electronic device 200 is to be placed at an upper portion of the interface surface. The alignment indicator indicates a location of the electronic device 200 where an alignment between the transmitting coil 1111a mounted at a lower portion of the interface surface and the receiving coil 2911a can be suitably implemented. The alignment indicator may alternatively be simple marks, or may be formed in the form of a protrusion structure for guiding the location of the electronic device 200. Otherwise, the alignment indicator may be formed in the form of a magnetic body such as a magnet mounted at a lower portion of the interface surface, thereby guiding the coils to be suitably arranged by mutual magnetism to a magnetic body having an opposite polarity mounted within the electronic device 200.

On the other hand, the wireless power transmitter 100 may be formed to include one or more transmitting coils. The wireless power transmitter 100 may selectively use some of coils suitably arranged with the receiving coil 2911a of the electronic device 200 among the one or more transmitting coils to enhance the power transmission efficiency. The wireless power transmitter 100 including the one or more transmitting coils will be described later with reference to FIG. 5.

Hereinafter, a configuration of the wireless power transmitter and electronic device using an inductive coupling method applicable to the embodiments disclosed herein will be described in detail.

Figure 4A:
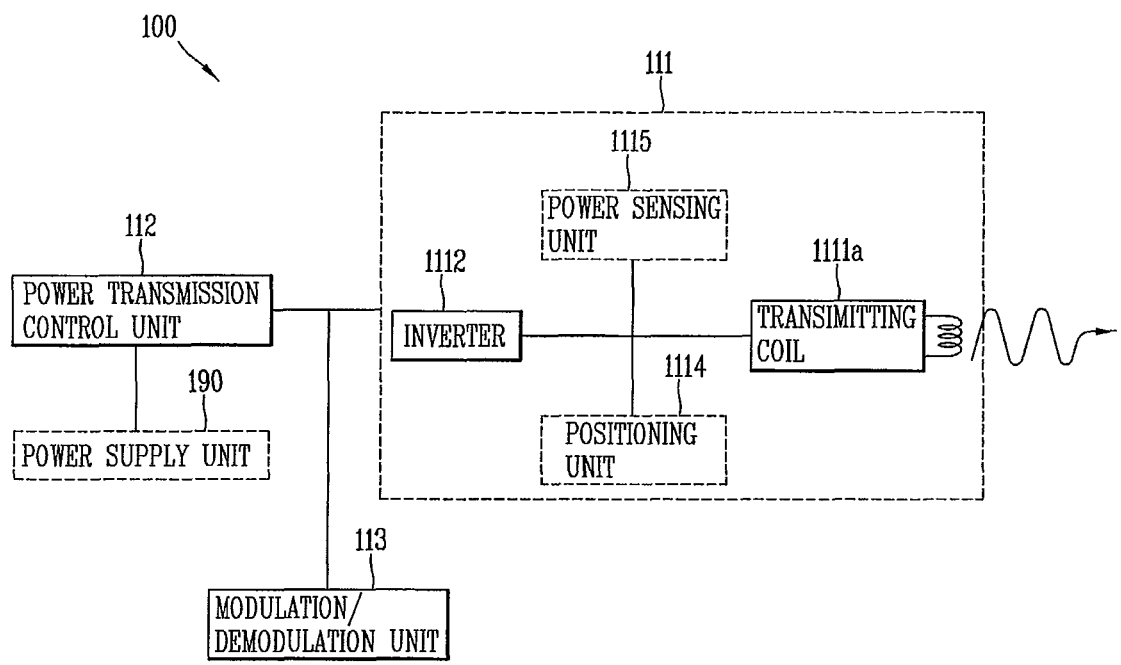
FIGS. 4A and 4B are block diagrams illustrating part of the wireless power transmitter 100 and electronic device 200 in a magnetic induction method that can be employed in the embodiments disclosed herein.
Figure 4B:
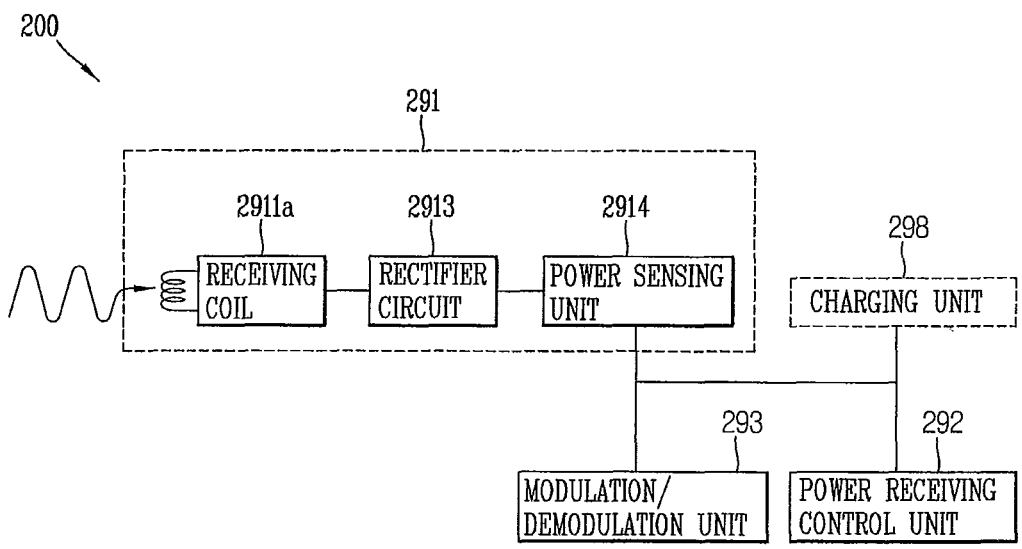

FIGS. 4A and 4B—Wireless Power Transmitter and Electronic Device in Inductive Coupling Method FIGS. 4A and 4B are block diagrams illustrating part of the wireless power transmitter 100 and electronic device 200 in a magnetic induction method that can be employed in the embodiments disclosed herein. A configuration of the power transmission unit 110 included in the wireless power transmitter 100 will be described with reference to FIG. 4A, and a configuration of the power supply unit 290 included in the electronic device 200 will be described with reference to FIG. 4B.

Referring to FIG. 4A, the power conversion unit 111 of the wireless power transmitter 100 may include a transmitting (Tx) coil 1111a and an inverter 1112.

The transmitting coil 1111a may form a magnetic field corresponding to the wireless power signal according to a change of current as described above. The transmitting coil 1111a may alternatively be implemented with a planar spiral type or cylindrical solenoid type.

The inverter 1112 transforms a DC input obtained from the power supply unit 190 into an AC waveform. The AC current transformed by the inverter 1112 drives a resonant circuit including the transmitting coil 1111a and a capacitor (not shown) to form a magnetic field in the transmitting coil 1111a.

In addition, the power conversion unit 111 may further include a positioning unit 1114.

The positioning unit 1114 may move or rotate the transmitting coil 1111a to enhance the effectiveness of contactless power transfer using the inductive coupling method. As described above, it is because an alignment and distance between the wireless power transmitter 100 and the electronic device 200 including a primary coil and a secondary coil may affect power transfer using the inductive coupling method. In particular, the positioning unit 1114 may be used when the electronic device 200 does not exist within an active area of the wireless power transmitter 100.

Accordingly, the positioning unit 1114 may include a drive unit (not shown) for moving the transmitting coil 1111a such that a center-to-center distance of the transmitting coil 1111a of the wireless power transmitter 100 and the receiving coil 2911a of the electronic device 200 is within a predetermined range, or rotating the transmitting coil 1111a such that the centers of the transmitting coil 1111a and the receiving coil 2911a are overlapped with each other.

For this purpose, the wireless power transmitter 100 may further include a detection unit (not shown) made of a sensor for detecting the location of the electronic device 200, and the power transmission control unit 112 may control the positioning unit 1114 based on the location information of the electronic device 200 received from the location detection sensor.

Furthermore, to this end, the power transmission control unit 112 may receive control information on an alignment or distance to the electronic device 200 through the power communications modulation/demodulation unit 113, and control the positioning unit 1114 based on the received control information on the alignment or distance.

If the power conversion unit 111 is configured to include a plurality of transmitting coils, then the positioning unit 1114 may determine which one of the plurality of transmitting coils is to be used for power transmission. The configuration of the wireless power transmitter 100 including the plurality of transmitting coils will be described later with reference to FIG. 5.

On the other hand, the power conversion unit 111 may further include a power sensing unit 1115. The power sensing unit 1115 at the side of the wireless power transmitter 100 monitors a current or voltage flowing into the transmitting coil 1111a. The power sensing unit 1115 is provided to check whether or not the wireless power transmitter 100 is normally operated, and thus the power sensing unit 1115 may detect a voltage or current of the power supplied from the outside, and check whether the detected voltage or current exceeds a threshold value. The power sensing unit 1115, although not shown, may include a resistor for detecting a voltage or current of the power supplied from the outside and a comparator for comparing a voltage value or current value of the detected power with a threshold value to output the comparison result. Based on the check result of the power sensing unit 1115, the power transmission control unit 112 may control a switching unit (not shown) to cut off power applied to the transmitting coil 1111a.

Referring to FIG. 4B, the power supply unit 290 of the electronic device 200 may include a receiving (Rx) coil 2911a and a rectifier generation circuit 2913.

A current is induced into the receiving coil 2911a by a change of the magnetic field formed in the transmitting coil 1111a. The implementation type of the receiving coil 2911a may be a planar spiral type or cylindrical solenoid type similarly to the transmitting coil 1111a.

Furthermore, series and parallel capacitors may be configured to be connected to the receiving coil 2911a to enhance the effectiveness of wireless power reception or perform resonant detection.

The receiving coil 2911a may be in the form of a single coil or a plurality of coils.

The rectifier generation circuit 2913 performs a full-wave rectification to a current to convert alternating current into direct current. The rectifier generation circuit 2913, for instance, may be implemented with a full-bridge rectifier generation circuit made of four diodes or a circuit using active components.

In addition, the rectifier generation circuit 2913 may further include a regulator circuit for converting a rectified current into a more flat and stable direct current. Furthermore, the output power of the rectifier generation circuit 2913 is supplied to each constituent element of the power supply unit 290. Furthermore, the rectifier generation circuit 2913 may further include a DC-DC converter for converting output DC power into a suitable voltage to adjust it to the power required for each constituent element (for instance, a circuit such as a charger 298).

The power communications modulation/demodulation unit 293 may be connected to the power receiving unit 291, and may be configured with a resistive element in which resistance varies with respect to direct current, and may be configured with a capacitive element in which reactance varies with respect to alternating current. The Power reception control unit (or POWER RECEIVING CONTROL UNIT) 292 may change the resistance or reactance of the power communications modulation/demodulation unit 293 to modulate a wireless power signal received to the power receiving unit 291.

On the other hand, the power supply unit 290 may further include a power sensing unit 2914. The power sensing unit 2914 at the side of the electronic device 200 monitors a voltage and/or current of the power rectified by the rectifier generation circuit 2913, and if the voltage and/or current of the rectified power exceeds a threshold value as a result of monitoring, then the Power reception control unit (or POWER RECEIVING CONTROL UNIT) 292 transmits a power control message to the wireless power transmitter 100 to transfer suitable power.

Figure 5:
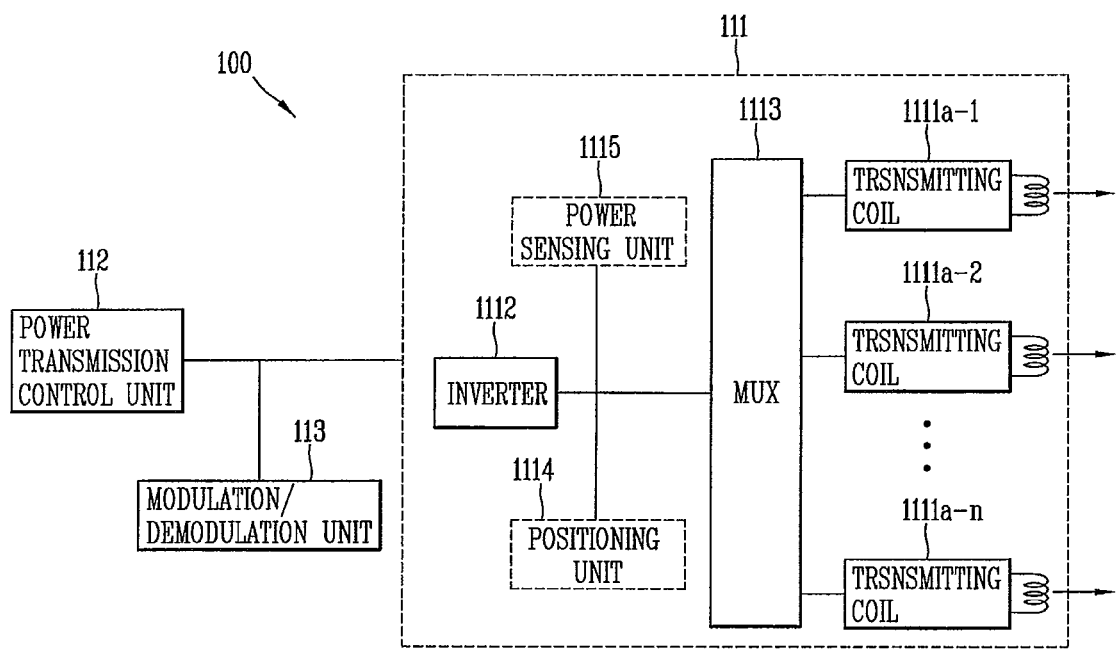
FIG. 5 is a block diagram illustrating a wireless power transmitter configured to have one or more transmission coils receiving power according to an inductive coupling method that can be employed in the embodiments disclosed herein.

FIG. 5—Wireless Power Transmitter Configured to Include One or More Transmitting Coils FIG. 5 is a block diagram illustrating a wireless power transmitter configured to have one or more transmission coils receiving power according to an inductive coupling method that can be employed in the embodiments disclosed herein.

Referring to FIG. 5, the power conversion unit 111 of the wireless power transmitter 100 according to the embodiments disclosed herein may include one or more transmitting coils 1111a-1 to 1111a-n. The one or more transmitting coils 1111a-1 to 1111a-n may be an array of partly overlapping primary coils. An active area may be determined by some of the one or more transmitting coils.

The one or more transmitting coils 1111a-1 to 1111a-n may be mounted at a lower portion of the interface surface. Furthermore, the power conversion unit 111 may further include a multiplexer 1113 for establishing and releasing the connection of some of the one or more transmitting coils 1111a-1 to 1111a-n.

Upon detecting the location of the electronic device 200 placed at an upper portion of the interface surface, the power transmission control unit 112 may take the detected location of the electronic device 200 into consideration to control the multiplexer 1113, thereby allowing coils that can be placed in an inductive coupling relation to the receiving coil 2911a of the electronic device 200 among the one or more transmitting coils 1111a-1 to 1111a-n to be connected to one another.

For this purpose, the power transmission control unit 112 may acquire the location information of the electronic device 200. For example, the power transmission control unit 112 may acquire the location of the electronic device 200 on the interface surface by the location detection unit (not shown) provided in the wireless power transmitter 100. For another example, the power transmission control unit 112 may alternatively receive a power control message indicating a strength of the wireless power signal from an object on the interface surface or a power control message indicating the identification information of the object using the one or more transmitting coils 1111a-1 to 1111a-n, respectively, and determines whether it is located adjacent to which one of the one or more transmitting coils based on the received result, thereby acquiring the location information of the electronic device 200.

On the other hand, the active area as part of the interface surface may denote a portion through which a magnetic field with a high efficiency can pass when the wireless power transmitter 100 transfers power to the electronic device 200 in a wireless manner. At this time, a single transmitting coil or one or a combination of more transmitting coils forming a magnetic field passing through the active area may be designated as a primary cell. Accordingly, the power transmission control unit 112 may determine an active area based on the detected location of the electronic device 200, and establish the connection of a primary cell corresponding to the active area to control the multiplexer 1113, thereby allowing the receiving coil 2911a of the electronic device 200 and the coils belonging to the primary cell to be placed in an inductive coupling relation.

In the meantime, upon disposing one or more electronic devices 200 on an interface surface of the wireless power transmitter 100, which includes the one or more transmitting coils 1111a-1 to 1111a-n, the power transmission control unit 112 may control the multiplexer 1113 to allow the coils belonging to the primary cell corresponding to the position of each electronic device to be placed in the inductive coupling relation. Accordingly, the wireless power transmitter 100 may generate the wireless power signal using different coils, thereby transferring it to the one or more electronic devices in a wireless manner.

Also, the power transmission control unit 112 may set power having a different characteristic to be supplied to each of the coils corresponding to the electronic devices. Here, the wireless power transmitter 100 may transfer power by differently setting a power transfer scheme, efficiency, characteristic and the like for each electronic device. The power transmission for one or more electronic devices will be described later with reference to FIG. 28.

Furthermore, the power conversion unit 111 may further include an impedance matching unit (not shown) for controlling an impedance to form a resonant circuit with the coils connected thereto.

Hereinafter, a method for allowing a wireless power transmitter to transfer power according to a resonance coupling method will be disclosed with reference to FIGS. 6 through 8.

Figure 6:
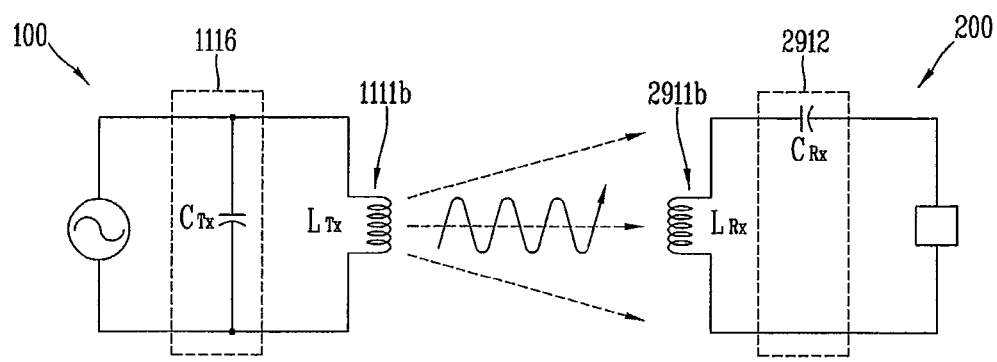
FIG. 6 is a view illustrating a concept in which power is transferred to an electronic device from a wireless power transmitter in a wireless manner according to a resonance coupling method.

FIG. 6—Resonance Coupling Method

FIG. 6 is a view illustrating a concept in which power is transferred to an electronic device from a wireless power transmitter in a wireless manner according to an resonance coupling method.

First, resonance will be described in brief as follows. Resonance refers to a phenomenon in which an amplitude of vibration is remarkably increased when periodically receiving an external force having the same frequency as the natural frequency of a vibration system. Resonance is a phenomenon occurring at all kinds of vibrations such as mechanical vibration, electric vibration, and the like. Generally, when exerting a vibratory force to a vibration system from the outside, if the natural frequency thereof is the same as a frequency of the externally applied force, then the vibration becomes strong, thus increasing the width.

With the same principle, when a plurality of vibrating bodies separated from one another within a predetermined distance vibrate at the same frequency, the plurality of vibrating bodies resonate with one another, and in this case, resulting in a reduced resistance between the plurality of vibrating bodies. In an electrical circuit, a resonant circuit can be made by using an inductor and a capacitor.

When the wireless power transmitter 100 transfers power according to the inductive coupling method, a magnetic field having a specific vibration frequency is formed by alternating current power in the power transmission unit 110. If a resonance phenomenon occurs in the electronic device 200 by the formed magnetic field, then power is generated by the resonance phenomenon in the electronic device 200.

Describing a principle of the resonance coupling, in general, a method for transferring power by generating an electromagnetic wave exhibits low power transmission efficiency, and may badly affect human bodies due to radiation of the electromagnetic waves and exposure to the electromagnetic waves.

However, if the plurality of vibrating bodies resonate with each other in an electromagnetic manner as aforementioned, extremely high power transmission efficiency may be exhibited due to non affection by adjacent objects except for the vibrating bodies. An energy tunnel may be generated between the plurality of vibrating bodies which resonate with each other in the electromagnetic manner. This may be referred to as energy coupling or energy tail.

The resonance coupling disclosed herein may use an electromagnetic wave having a low frequency. When power is transferred using the electromagnetic wave having the low frequency, only a magnetic field may affect an area located within a single wavelength of the electromagnetic wave. The magnetic resonance may be generated when the wireless power transmitter 100 and the electronic device 200 are located within the single wavelength of the electromagnetic wave having the low frequency.

Here, in general, human bodies are sensitive to an electric field but tolerant to a magnetic field. Hence, when power is transferred using a magnetic resonance, the human bodies may be badly affected due to being exposed to the electromagnetic wave. Also, as the energy tail is generated in response to the resonance phenomenon, the form of power transmission may exhibit a non-radiative property. Consequently, upon transferring power using such electromagnetic wave, a radiative problem which occurs frequently may be solved.

The resonance coupling method may be a method for transferring power using the electromagnetic wave with the low frequency, as aforementioned. Thus, the transmitting coil 1111b of the wireless power transmitter 100 may form a magnetic field or electromagnetic wave for transferring power in principle. However, the resonance coupling method will be described hereinafter from the perspective of a magnetic resonance, namely, a power transmission by a magnetic field.

The resonant frequency may be determined by the following formula in Equation 1.

$$f = \frac{1}{2\pi\sqrt{LC}} \qquad \text{[Equation 1]}$$

Here, the resonant frequency (f) is determined by an inductance (L) and a capacitance (C) in a circuit. In a circuit forming a magnetic field using a coil, the inductance can be determined by a number of turns of the coil, and the like, and the capacitance can be determined by a gap between the coils, an area, and the like. In addition to the coil, a capacitive resonant circuit may be configured to be connected thereto to determine the resonant frequency.

Referring to FIG. 6, when power is transmitted in a wireless manner according to the resonance coupling method, the power conversion unit 111 of the wireless power transmitter 100 may include a transmitting (Tx) coil 1111b in which a magnetic field is formed and a resonant circuit (or RESONANT GENERATION CIRCUIT) 1116 connected to the transmitting coil 1111b to determine a specific vibration frequency. The resonant circuit (or RESONANT GENERATION CIRCUIT) 1116 may be implemented by using a capacitive circuit (capacitors), and the specific vibration frequency may be determined based on an inductance of the transmitting coil 1111b and a capacitance of the resonant circuit (or RESONANT GENERATION CIRCUIT) 1116.

The configuration of a circuit element of the resonant circuit (or RESONANT GENERATION CIRCUIT) 1116 may be implemented in various forms such that the power conversion unit 111 forms a magnetic field, and is not limited to a form of being connected in parallel to the transmitting coil 1111b as illustrated in FIG. 6.

Furthermore, the power receiving unit 291 of the electronic device 200 may include a resonant circuit 2912 and a receiving (Rx) coil 2911b to generate a resonance phenomenon by a magnetic field formed in the wireless power transmitter 100. In other words, the resonant circuit 2912 may be also implemented by using a capacitive circuit, and the resonant circuit 2912 is configured such that a resonant frequency determined based on an inductance of the receiving coil 2911b and a capacitance of the resonant circuit 2912 has the same frequency as a resonant frequency of the formed magnetic field.

The configuration of a circuit element of the resonant circuit 2912 may be implemented in various forms such that the power receiving unit 291 generates resonance by a magnetic field, and is not limited to a form of being connected in series to the receiving coil 2911b as illustrated in FIG. 6.

The specific vibration frequency in the wireless power transmitter 100 may have $L_{TX}$, $C_{TX}$, and may be acquired by using the Equation 1. Here, the electronic device 200 generates resonance when a result of substituting the $L_{RX}$ and $C_{RX}$ of the electronic device 200 to the Equation 1 is same as the specific vibration frequency.

According to a contactless power transfer method by resonance coupling, when the wireless power transmitter 100 and electronic device 200 resonate at the same frequency, respectively, an electromagnetic wave is propagated through a short-range magnetic field, and thus there exists no energy transfer between the devices if they have different frequencies.

As a result, an efficiency of contactless power transfer by the resonance coupling method is greatly affected by a frequency characteristic, whereas the effect of an alignment and distance between the wireless power transmitter 100 and the electronic device 200 including each coil is relatively smaller than the inductive coupling method.

Hereinafter, the configuration of a wireless power transmitter and an electronic device in the resonance coupling method applicable to the embodiments disclosed herein will be described in detail.

Figure 7A:
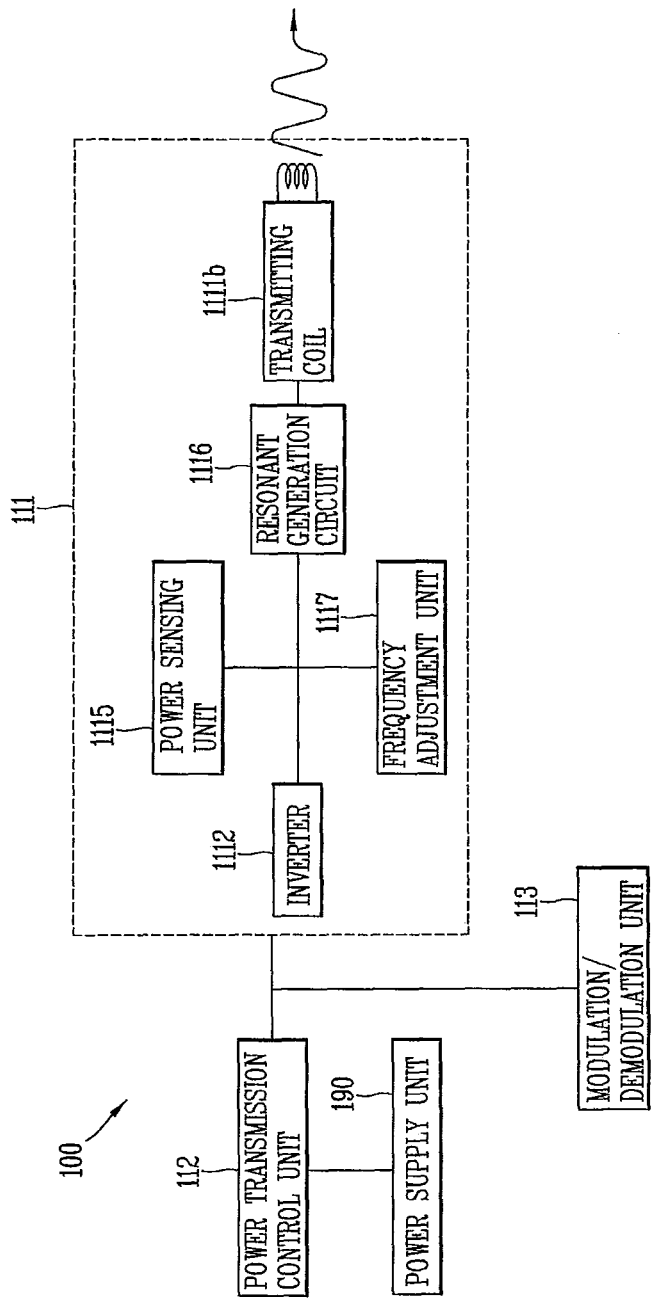
FIGS. 7A and 7B are block diagrams illustrating part of the wireless power transmitter 100 and electronic device 200 in a resonance method that can be employed in the embodiments disclosed herein.
Figure 7B:
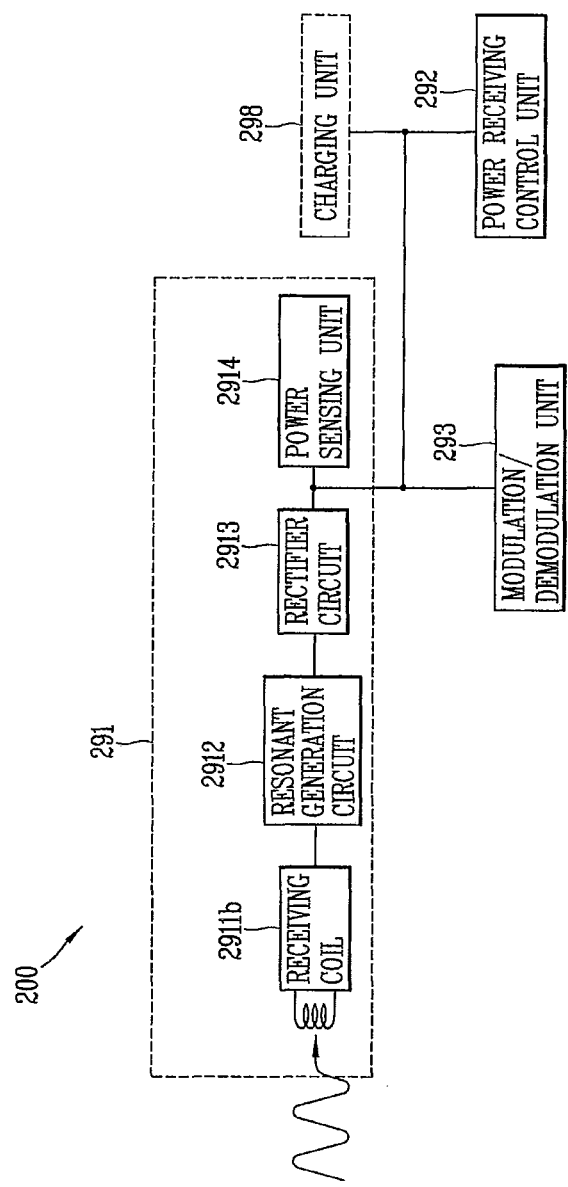

FIGS. 7A and 7B—Wireless Power Transmitter in Resonance Coupling Method

FIGS. 7A and 7B are block diagrams illustrating part of the wireless power transmitter 100 and electronic device 200 in a resonance method that can be employed in the embodiments disclosed herein.

A configuration of the power transmission unit 110 included in the wireless power transmitter 100 will be described with reference to FIG. 7A.

The power conversion unit 111 of the wireless power transmitter 100 may include a transmitting (Tx) coil 1111b, an inverter 1112, and a resonant circuit (or RESONANT GENERATION CIRCUIT) 1116. The inverter 1112 may be configured to be connected to the transmitting coil 1111b and the resonant circuit (or RESONANT GENERATION CIRCUIT) 1116.

The transmitting coil 1111b may be mounted separately from the transmitting coil 1111a for transferring power according to the inductive coupling method, but may transfer power in the inductive coupling method and resonance coupling method using one single coil.

The transmitting coil 1111b, as described above, forms a magnetic field for transferring power. The transmitting coil 1111b and the resonant circuit (or RESONANT GENERATION CIRCUIT) 1116 generate resonance when alternating current power is applied thereto, and at this time, a vibration frequency may be determined based on an inductance of the transmitting coil 1111b and a capacitance of the resonant circuit (or RESONANT GENERATION CIRCUIT) 1116.

For this purpose, the inverter 1112 transforms a DC input obtained from the power supply unit 190 into an AC waveform, and the transformed AC current is applied to the transmitting coil 1111b and the resonant circuit (or RESONANT GENERATION CIRCUIT) 1116.

In addition, the power conversion unit 111 may further include a frequency adjustment unit 1117 for changing a resonant frequency of the power conversion unit 111. The resonant frequency of the power conversion unit 111 is determined based on an inductance and/or capacitance within a circuit constituting the power conversion unit 111 by Equation 1, and thus the power transmission control unit 112 may determine the resonant frequency of the power conversion unit 111 by controlling the frequency adjustment unit 1117 to change the inductance and/or capacitance.

The frequency adjustment unit 1117, for example, may be configured to include a motor for adjusting a distance between capacitors included in the resonant circuit (or RESONANT GENERATION CIRCUIT) 1116 to change a capacitance, or include a motor for adjusting a number of turns or diameter of the transmitting coil 1111b to change an inductance, or include active elements for determining the capacitance and/or inductance On the other hand, the power conversion unit 111 may further include a power sensing unit 1115. The operation of the power sensing unit 1115 is the same as the foregoing description.

Referring to FIG. 7B, a configuration of the power supply unit 290 included in the electronic device 200 will be described. The power supply unit 290, as described above, may include the receiving (Rx) coil 2911b and resonant circuit 2912.

In addition, the power receiving unit 291 of the power supply unit 290 may further include a rectifier generation circuit 2913 for converting an AC current generated by resonance phenomenon into DC. The rectifier generation circuit 2913 may be configured similarly to the foregoing description.

Furthermore, the power receiving unit 291 may further include a power sensing unit 2914 for monitoring a voltage and/or current of the rectified power. The power sensing unit 2914 may be configured similarly to the foregoing description.

Figure 8:
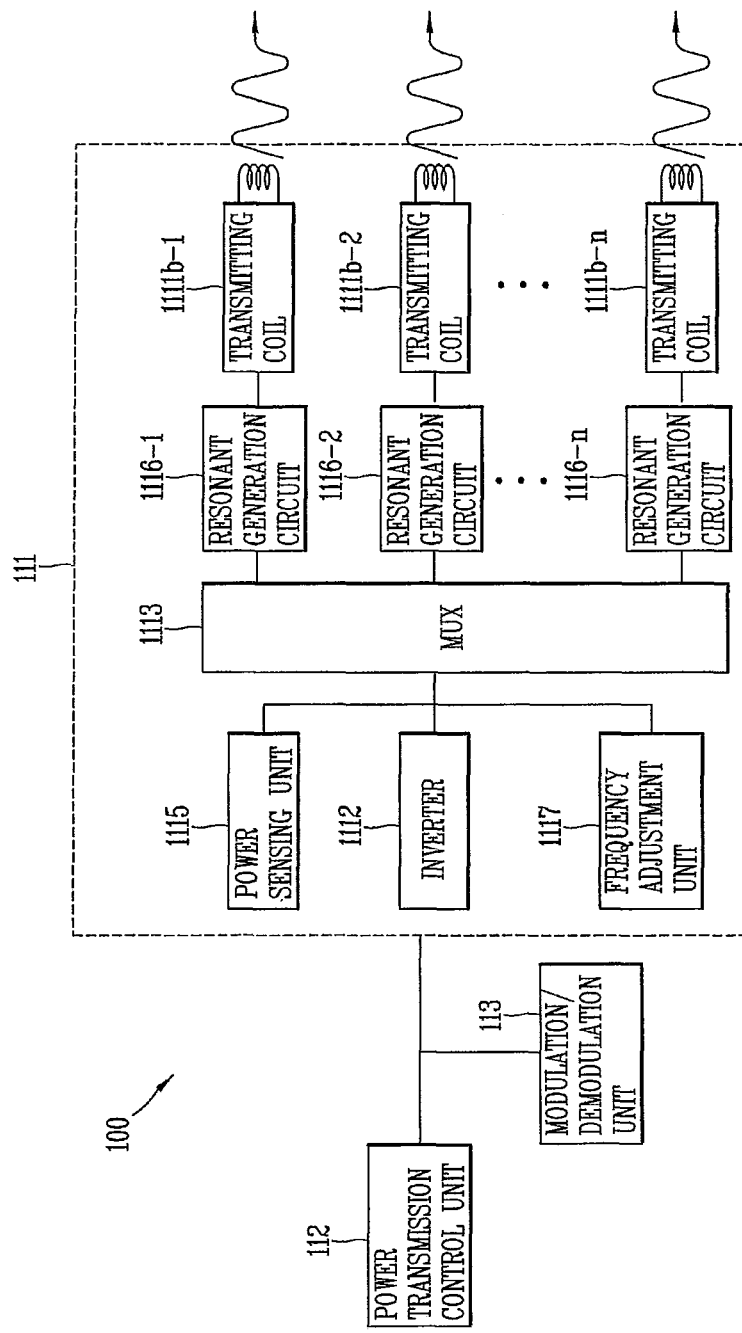
FIG. 8 is a block diagram illustrating a wireless power transmitter configured to have one or more transmission coils receiving power according to a resonance coupling method that can be employed in the embodiments disclosed herein.

FIG. 8—Wireless Power Transmitter Configured to Include One or More Transmitting Coils FIG. 8 is a block diagram illustrating a wireless power transmitter configured to have one or more transmission coils receiving power according to an resonance coupling method that can be employed in the embodiments disclosed herein.

Referring to FIG. 8, the power conversion unit 111 of the wireless power transmitter 100 according to the embodiments disclosed herein may include one or more transmitting coils 1111b-1 to 1111b-n and resonant circuits (1116-1 to 1116-n) connected to each transmitting coils. Furthermore, the power conversion unit 111 may further include a multiplexer 1113 for establishing and releasing the connection of some of the one or more transmitting coils 1111b-1 to 1111b-n.

The one or more transmitting coils 1111b-1 to 1111b-n may be configured to have the same vibration frequency, or some of them may be configured to have different vibration frequencies. It is determined by an inductance and/or capacitance of the resonant circuits (1116-1 to 1116-$n$) connected to the one or more transmitting coils 1111$b$-1 to 1111$b$-$n$, respectively.

In the meantime, when one or more electronic devices 200 are disposed in an active area or a detection area of the wireless power transmitter 100 including the one or more transmitting coils 1111$b$-1 to 1111$b$-$n$, the power transmission control unit 112 may control the multiplexer 1113 to allow the electronic devices to be placed in different resonance coupling relations. Accordingly, the wireless power transmitter 100 may wirelessly transfer power to the one or more electronic devices by generating the wireless power signal using different coils.

In addition, the power transmission control unit 112 may set power with a different characteristic to be supplied to each of the coils corresponding to the electronic devices. Here, the wireless power transmitter 100 may transfer power by differently setting a power transmission scheme, a resonant frequency, efficiency, a characteristic and the like for each electronic device. The power transmission for one or more electronic devices will be described later with reference to FIG. 28. For this purpose, the frequency adjustment unit 1117 may be configured to change an inductance and/or capacitance of the resonant circuits (1116-1 to 1116-$n$) connected to the one or more transmitting coils 1111$b$-1 to 1111$b$-$n$, respectively.

Figure 9:
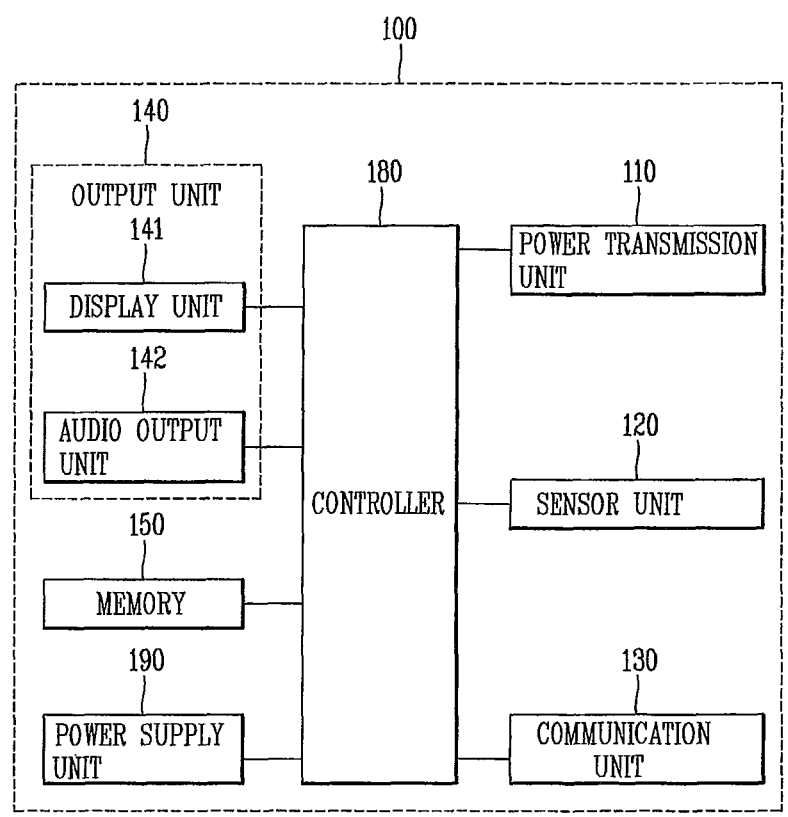
FIG. 9 is a block diagram illustrating a wireless power transmitter further including an additional element in addition to the configuration illustrated in FIG. 2A.

FIG. 9—Wireless Power Transmitter Implemented by Charger

On the other hand, hereinafter, an example of the wireless power transmitter implemented in the form of a wireless charger will be described.

FIG. 9 is a block diagram illustrating a wireless power transmitter further including an additional element in addition to the configuration illustrated in FIG. 2A.

Referring to FIG. 9, the wireless power transmitter 100 may further include a sensor unit 120, a communication unit 130, an output unit 140, a memory 150, and a control unit (or Controller) 180 in addition to the power transmission unit 110 and power supply unit 190 for supporting at least one of the foregoing inductive coupling method and resonance coupling method.

The control unit (or Controller) 180 controls the power transmission unit 110, the sensor unit 120, the communication unit 130, the output unit 140, the memory 150, and the power supply unit 190.

The control unit (or Controller) 180 may be implemented by a module separated from the power transmission control unit 112 in the power transmission unit 110 described with reference to FIG. 2 or may be implemented by a single module.

The sensor unit 120 may include a sensor for detecting the location of the electronic device 200. The location information detected by the sensor unit 120 may be used for allowing the power transmission unit 110 to transfer power in an efficient manner.

For instance, in case of wireless power transfer according to the inductive coupling method, the sensor unit 120 may be operated as a detection unit, and the location information detected by the sensor unit 120 may be used to move or rotate the transmitting coil 1111$a$ in the power transmission unit 110.

Furthermore, for example, the wireless power transmitter 100 configured to include the foregoing one or more transmitting coils may determine coils that can be placed in an inductive coupling relation or resonance coupling relation to the receiving coil of the electronic device 200 among the one or more transmitting coils based on the location information of the electronic device 200.

On the other hand, the sensor unit 120 may be configured to monitor whether or not the electronic device 200 approaches a chargeable region. The approach or non-approach detection function of the sensor unit 120 may be carried out separately from the function of allowing the power transmission control unit 112 in the power transmission unit 110 to detect the approach or non-approach of the electronic device 200.

The communication unit 130 performs wired or wireless data communication with the electronic device 200. The communication unit 130 may include an electronic component for at least any one of Bluetooth™, Zigbee, Ultra Wide Band (UWB), Wireless USB, Near Field Communication (NFC), and Wireless LAN.

The output unit 140 may include at least one of a display unit 141 and an audio output unit (or SOUND OUTPUT UNIT) 142. The display unit 141 may include at least one of a liquid crystal display (LCD), a thin film transistor-liquid crystal display (TFT-LCD), an organic light-emitting diode (OLED), a flexible display, and a three-dimensional (3D) display. The display unit 141 may display a charging state under the control of the control unit (or Controller) 180.

The memory 150 may include at least one storage medium of a flash memory type, a hard disk type, a multimedia card micro type, a card type memory (e.g., SD or XD memory), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disk, and the like. The wireless power transmitter 100 may operate in association with a web storage performing the storage function of the memory 150 on the Internet. A program or commands performing the foregoing functions of the wireless power transmitter 100 may be stored in the memory 150. The control unit (or Controller) 180 may perform the program or commands stored in the memory 150 to transmit power in a wireless manner. A memory controller (not shown) may be used to allow other constituent elements (e.g., control unit (or Controller) 180) included in the wireless power transmitter 100 to access the memory 150.

However, it would be easily understood by those skilled in the art that the configuration of a wireless power transmitter according to the embodiment disclosed herein may be applicable to an apparatus, such as a docking station, a terminal cradle device, and an electronic device, and the like, excluding a case where it is applicable to only a wireless charger.

FIG. 10—Wireless Power Receiver Implemented with Mobile Terminal

FIG. 10 is view illustrating a configuration in case where an electronic device 200 according to the embodiments disclosed herein is implemented in the form of a mobile terminal.

The mobile communication terminal 200 may include a power supply unit 290 illustrated in FIG. 2, 4, or 7.

Furthermore, the terminal 200 may further include a wireless communication unit 210, an Audio/Video (A/V) input unit 220, a user input unit 230, a sensing unit 240, an output unit 250, a memory 260, an interface unit 270, and a controller 280. FIG. 10 illustrates the terminal 100 having various components, but it is understood that implementing all of the illustrated components is not a requirement. Greater or fewer components may alternatively be implemented.

Hereinafter, each component is described in sequence.

The wireless communication unit 210 may typically include one or more modules which permit wireless communications between the terminal 200 and a wireless communication system or between the terminal 200 and a network within which the terminal 200 is located. For example, the wireless communication unit 210 may include a broadcast receiving module 211, a mobile communication module 212, a wireless internet module 213, a short-range communication module 214, a position location module 215 and the like.

The broadcast receiving module 211 receives a broadcast signal and/or broadcast associated information from an external broadcast managing entity via a broadcast channel.

The broadcast channel may include a satellite channel and a terrestrial channel. The broadcast center may indicate a server which generates and transmits a broadcast signal and/or broadcast associated information or a server which receives a pre-generated broadcast signal and/or broadcast associated information and sends them to the portable terminal. The broadcast signal may be implemented as a TV broadcast signal, a radio broadcast signal, and a data broadcast signal, among others. The broadcast signal may further include a data broadcast signal combined with a TV or radio broadcast signal.

Examples of broadcast associated information may denote information associated with a broadcast channel, a broadcast program, a broadcast service provider, and the like. The broadcast associated information may be provided via a mobile communication network. In this case, it may be received by the mobile communication module 212.

The broadcast associated information may be implemented in various formats. For instance, broadcast associated information may include Electronic Program Guide (EPG) of Digital Multimedia Broadcasting (DMB), Electronic Service Guide (ESG) of Digital Video Broadcast-Handheld (DVB-H), and the like.

The broadcast receiving module 211 may be configured to receive digital broadcast signals transmitted from various types of broadcast systems. Such broadcast systems may include Digital Multimedia Broadcasting-Terrestrial (DMB-T), Digital Multimedia Broadcasting-Satellite (DMB-S), Media Forward Link Only (MediaFLO), Digital Video Broadcast-Handheld (DVB-H), Integrated Services Digital Broadcast-Terrestrial (ISDB-T) and the like. The broadcast receiving module 211 may be configured to be suitable for every broadcast system transmitting broadcast signals as well as the digital broadcasting systems.

Broadcast signals and/or broadcast associated information received via the broadcast receiving module 211 may be stored in a suitable device, such as a memory 260.

The mobile communication module 212 transmits/receives wireless signals to/from at least any one of a base station, an external portable terminal, and a server on a mobile communication network. The wireless signal may include audio call signal, video (telephony) call signal, or various formats of data according to transmission/reception of text/multimedia messages.

The wireless internet module 213 supports wireless Internet access for the mobile terminal 200. This module may be internally or externally coupled to the terminal 100. Examples of such wireless Internet access may include Wireless LAN (WLAN) (Wi-Fi), Wireless Broadband (Wibro), Worldwide Interoperability for Microwave Access (Wimax), High Speed Downlink Packet Access (HSDPA) and the like.

The short-range communication module 214 denotes a module for short-range communications. Suitable technologies for implementing this module may include Bluetooth, Radio Frequency IDentification (RFID), Infrared Data Association (IrDA), Ultra-WideBand (UWB), ZigBee, and the like. On the other hand, Universal Serial Bus (USB), IEEE 1394, Thunderbolt of Intel technology, and the like, may be used for wired short-range communication.

The wireless internet module 213 or the short-range communication module 214 may establish data communication connection to the wireless power transmitter 100.

Through the established data communication, when there is an audio signal to be outputted while transferring power in a wireless manner, the wireless internet module 213 or the short-range communication module 214 may transmit the audio signal to the wireless power transmitter 100 through the short-range communication module. Furthermore, through the established data communication, when there is information to be displayed, the wireless internet module 213 or the short-range communication module 214 may transmit the information to the wireless power transmitter 100. Otherwise, the wireless internet module 213 or the short-range communication module 214 may transmit an audio signal received through a microphone integrated in the wireless power transmitter 100. Furthermore, the wireless internet module 213 or the short-range communication module 214 may transmit the identification information (e.g., phone number or device name in case of a portable phone) of the mobile terminal 200 to the wireless power transmitter 100 through the established data communication.

The position location module 215 is a module for acquiring a position of the terminal. An example of the position location module 215 may include a Global Position System (GPS) module.

Referring to FIG. 10, the A/V input unit 220 is configured to provide audio or video signal input to the portable terminal. The A/V input unit 220 may include a camera 221 and a microphone 222. The camera 221 processes image frames of still or moving images obtained by an image sensor in a video call mode or a capture more. The processed image frames may be displayed on the display unit 251.

The image frames processed by the camera 221 may be stored in the memory 260 or transmitted to the exterior via the wireless communication unit 210. Two or more cameras 221 may be provided therein according to the use environment.

The microphone 222 may receive an external audio signal by a microphone in a phone call mode, a recording mode, a voice recognition mode, or the like to process it into electrical audio data. The processed audio data is converted and outputted into a format transmittable to a mobile communication base station via the mobile communication module 212 in case of the phone call mode. The microphone 222 may include various noise removal algorithms to remove noises generated while receiving the external audio signal.

The user input unit 230 may generate input data to allow the user to control the operation of the terminal. The user input unit 230 may include a keypad, a dome switch, a touchpad (e.g., static pressure/capacitance), a jog wheel, a jog switch and the like.

The sensing unit 240 may include a proximity sensor 241, a pressure sensor 242, a motion sensor 243, and the like. The proximity sensor 241 detects an object approaching the mobile terminal 200, or the presence or absence of an object existing adjacent to the mobile terminal 200, and the like without any mechanical contact. The proximity sensor 241 may detect a proximity object using a change of the AC magnetic field or static magnetic field, a change rate of the electrostatic capacity, or the like. Two or more proximity sensors 241 may be provided according to the aspect of configuration.

The pressure sensor 242 may detect whether or not a pressure is applied to the mobile terminal 200, a size of the pressure, and the like. The pressure sensor 242 may be provided at a portion where the detection of a pressure is required in the mobile terminal 200 according to the use environment. When the pressure sensor 242 is provided in the display unit 251, it may be possible to identify a touch input through the display unit 251 and a pressure touch input by which a pressure larger than the touch input is applied according to a signal outputted from the pressure sensor 242. Furthermore, it may be possible to know a size of the pressure applied to the display unit 251 during the input of a pressure touch.

The motion sensor 243 detects the location or movement of the mobile terminal 200 using an acceleration sensor, a gyro sensor, and the like. The acceleration sensor used in the motion sensor 243 is an element for converting an acceleration change in any one direction into an electrical signal. Two or three axes are typically integrated into a package to constitute an acceleration sensor, and only one Z-axis may be required according to the use environment. Accordingly, when an acceleration sensor in the direction of X-axis or Y-axis should be used instead of the direction of Z-axis due to any reason, the acceleration sensor may be erected and mounted on a main substrate using a separate piece substrate. Furthermore, the gyro sensor is a sensor for measuring an angular speed of the mobile terminal 200 in a rotational movement to detect a rotated angle with respect to each reference direction. For instance, the gyro sensor may detect each rotational angle, i.e., azimuth, pitch and roll, with reference to three directional axes.

The output unit 250 is provided to output visual, auditory, or tactile information. The output unit 250 may include a display unit 251, an audio output module 252, an alarm unit 253, a haptic module 254, and the like.

The display unit 251 may display (output) information processed in the terminal 200. For example, when the terminal is in a phone call mode, the display unit 251 will provide a User Interface (UI) or Graphic User Interface (GUI) associated with the call. When the terminal is in a video call mode or a capture mode, the display unit 251 may display images captured and/or received, UI, or GUI.

The display unit 251 may include at least one of a liquid crystal display (LCD), a thin film transistor-liquid crystal display (TFT-LCD), an organic light-emitting diode (OLED), a flexible display, a three-dimensional (3D) display, and the like.

Some of those displays may be configured as a transparent type or an light transmission type through which the outside is visible, which is referred to as a transparent display. A representative example of the transparent display may include a Transparent OLED (TOLED), or the like. The rear surface of the display unit 151 may also be implemented to be optically transparent. Under this configuration, the user can view an object positioned at a rear side of the terminal body through a region occupied by the display unit 251 of the terminal body.

The display unit 251 may be implemented in two or more in number according to a configured aspect of the terminal 200. For instance, a plurality of the display units 251 may be arranged on one surface to be spaced apart from or integrated with each other, or may be arranged on different surfaces.

Here, if the display unit 251 and a touch sensitive sensor (referred to as a touch sensor) have a layered structure therebetween, the display unit 251 may be used as an input device rather than an output device. The touch sensor may be implemented as a touch film, a touch sheet, a touch pad, and the like.

The touch sensor may be configured to convert changes of a pressure applied to a specific part of the display unit 251, or a capacitance occurring from a specific part of the display unit 251, into electric input signals. Also, the touch sensor may be configured to sense not only a touched position and a touched area, but also a touch pressure.

When touch inputs are sensed by the touch sensors, corresponding signals are sent to a touch controller. The touch controller processes the received signals, and then transmits corresponding data to the controller 280. Accordingly, the controller 280 may sense which region of the display unit 151 has been touched.

The proximity sensor 241 may be arranged at an inner region of the terminal covered by the touch screen, or near the touch screen. The proximity sensor refers to a sensor to sense the presence or absence of an object approaching a surface to be sensed, or an object disposed near a surface to be sensed, using an electromagnetic field or infrared rays without a mechanical contact. The proximity sensor has a longer lifespan and a more enhanced utility than a contact sensor.

The proximity sensor may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic field. In this case, the touch screen (touch sensor) may be categorized into a proximity sensor.

Hereinafter, for the sake of brief explanation, a status that the pointer is positioned to be proximate onto the touch screen without contact will be referred to as a "proximity touch", whereas a status that the pointer substantially comes in contact with the touch screen will be referred to as a "contact touch". For the position corresponding to the proximity touch of the pointer on the touch screen, such position corresponds to a position where the pointer faces perpendicular to the touch screen upon the proximity touch of the pointer.

The proximity sensor senses proximity touch, and proximity touch patterns (e.g., distance, direction, speed, time, position, moving status, etc.). Information relating to the sensed proximity touch and the sensed proximity touch patterns may be output onto the touch screen.

The audio output module 252 may output audio data received from the wireless communication unit 210 or stored in the memory 260, in a call-receiving mode, a call-placing mode, a recording mode, a voice recognition mode, a broadcast reception mode, and so on. The audio output module 252 may output audio signals relating to functions performed in the terminal 200, e.g., sound alarming a call received or a message received, and so on. The audio output module 252 may include a receiver, a speaker, a buzzer, and so on.

The alarm 253 outputs signals notifying the occurrence of an event from the terminal 200. The event occurring from the terminal 100 may include call received, message received, key signal input, touch input, and so on. The alarm 253 may output not only video or audio signals, but also other types of signals such as signals notifying occurrence of events in a vibration manner. Since the video or audio signals can be output through the display unit 251 or the audio output unit 252, the display unit 251 and the audio output module 252 may be categorized into part of the alarm 253.

The haptic module 254 generates various tactile effects which a user can feel. A representative example of the tactile effects generated by the haptic module 254 includes vibration. Vibration generated by the haptic module 254 may have a controllable intensity, a controllable pattern, and so on. For instance, different vibration may be output in a synthesized manner or in a sequential manner.

The haptic module 254 may generate various tactile effects, including not only vibration, but also arrangement of pins vertically moving with respect to a skin being contacted, air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like.

The haptic module 254 may be configured to transmit tactile effects through the user's direct contact, or the user's muscular sense using a finger or a hand. The haptic module 254 may be implemented in two or more in number according to the configuration of the terminal 200.

The memory 260 may store a program for the processing and control of the controller 280. Alternatively, the memory 260 may temporarily store input/output data (e.g., phonebook data, messages, still images, video and the like). Also, the memory 260 may store data related to various patterns of vibrations and audio output upon the touch input on the touch screen.

In some embodiments, software components including an operating system (not shown), a module performing a wireless communication unit 210 function, a module operating together with the user input unit 230, a module operating together with the A/V input unit 220, a module operating together with the output unit 250 may be stored in the memory 260. The operating system (e.g., LINUX, UNIX, OS X, WINDOWS, Chrome, Symbian, iOS, Android, VxWorks, or other embedded operating systems) may include various software components and/or drivers to control system tasks such as memory management, power management, and the like.

In addition, the memory 260 may store a setup program associated with contactless power transfer or wireless charging. The setup program may be implemented by the controller 280.

Furthermore, the memory 260 may store an application associated with contactless power transfer (or wireless charging) downloaded from an application providing server (for example, an app store). The wireless charging related application is a program for controlling wireless charging transmission, and thus the electronic device 200 may receive power from the wireless power transmitter 100 in a wireless manner or establish connection for data communication with the wireless power transmitter 100 through the relevant program.

The memory 260 may be implemented using any type of suitable storage medium including a flash memory type, a hard disk type, a multimedia card micro type, a memory card type (e.g., SD or xD memory), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disk, and the like. Also, the terminal 200 may be operated in association with a web storage performing the storage function of the memory 160 on the Internet.

The interface unit 270 may generally be implemented to interface the portable terminal with all external devices. The interface unit 270 may allow a data reception from an external device, a power delivery to each component in the terminal 200, or a data transmission from the terminal 200 to an external device. The interface unit 270 may include, for example, wired/wireless headset ports, external charger ports, wired/wireless data ports, memory card ports, ports for coupling devices having an identification module, audio input/output (I/O) ports, video input/output (I/O) ports, earphone ports, and the like.

The identification module may be configured as a chip for storing various information required to authenticate an authority to use the terminal 200, which may include a User Identity Module (UIM), a Subscriber Identity Module (SIM), and the like. Also, the device having the identification module (hereinafter, referred to as "identification device") may be implemented in a type of smart card. Hence, the identification device can be coupled to the terminal 200 via a port.

Also, the interface unit may serve as a path for power to be supplied from an external cradle to the terminal 200 when the terminal 100 is connected to the external cradle or as a path for transferring various command signals inputted from the cradle by a user to the terminal 200. Such various command signals or power inputted from the cradle may operate as signals for recognizing that the terminal 200 has accurately been mounted to the cradle.

The controller 280 typically controls the overall operations of the terminal 200. For example, the controller 280 performs the control and processing associated with telephony calls, data communications, video calls, and the like. The controller 280 may include a multimedia module 281 for multimedia playback. The multimedia module 281 may be implemented within the controller 280, or implemented separately from the controller 280.

The controller 280 can perform a pattern recognition processing so as to recognize a writing input or image drawing input carried out on the touch screen as a text or image.

The controller 280 performs wired or wireless charging according to the user input or internal input. Here, the internal input represents a signal for notifying that an induced current generated from a secondary coil within the terminal has been detected.

When the foregoing wireless charging is carried out, an operation of allowing the controller 280 to control each constituent element will be described in detail below with reference to the operation phase in FIG. 14. As described above, the Power reception control unit (or POWER RECEIVING CONTROL UNIT) 292 within the power supply unit 290 may be implemented to be included in the controller 280, and in the present disclosure, it should be understood that the controller 280 performs the operation by the Power reception control unit (or POWER RECEIVING CONTROL UNIT) 292.

The power supply unit 290 receives internal and external power under the control of the controller 280 to supply power required for the operation of each constituent element.

The power supply unit 290 is provided with a battery 299 for supplying power to each constituent element of the terminal 200, and the battery 299 may include a charger 298 for performing wired or wireless charging.

The present disclosure discloses a mobile terminal as an example of the apparatus for receiving power in a wireless manner, but it would be easily understood by those skilled in the art that the configuration according to the embodiment disclosed herein may be applicable to a stationary terminal, such as a digital TV, a desktop computer, and the like, excluding a case where it is to applicable to only the mobile terminal.

Figure 11A:
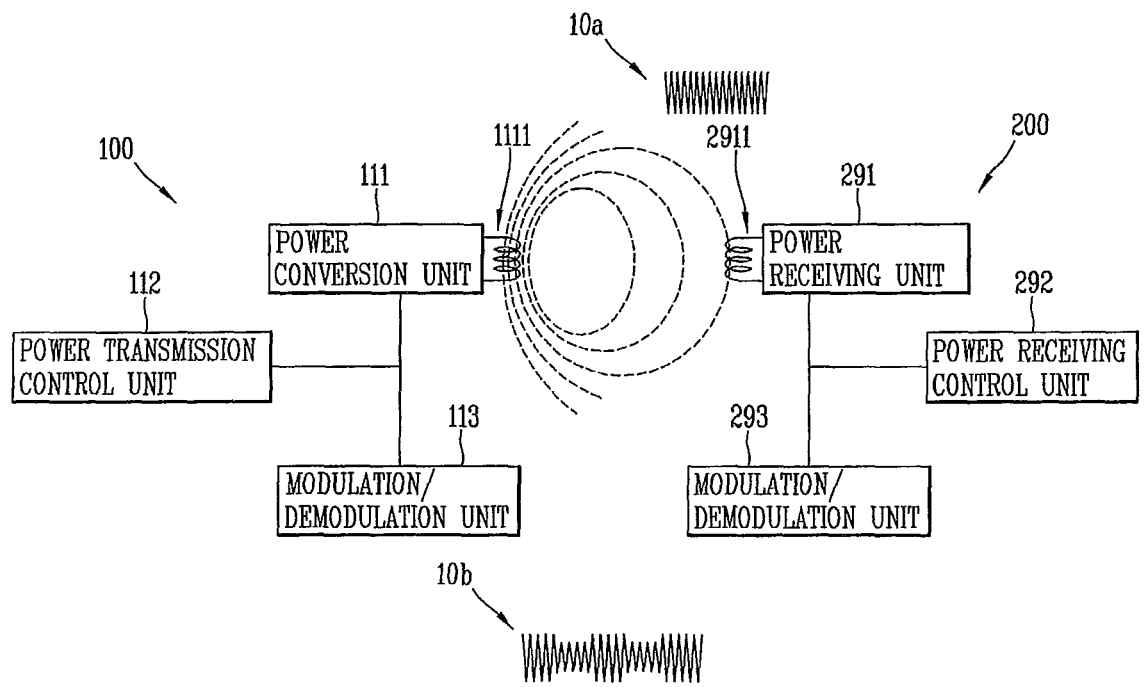
FIGS. 11A and 11B are views illustrating the concept of transmitting and receiving a packet between a wireless power transmitter and an electronic device through the modulation and demodulation of a wireless power signal in transferring power in a wireless manner disclosed herein.
Figure 11B:
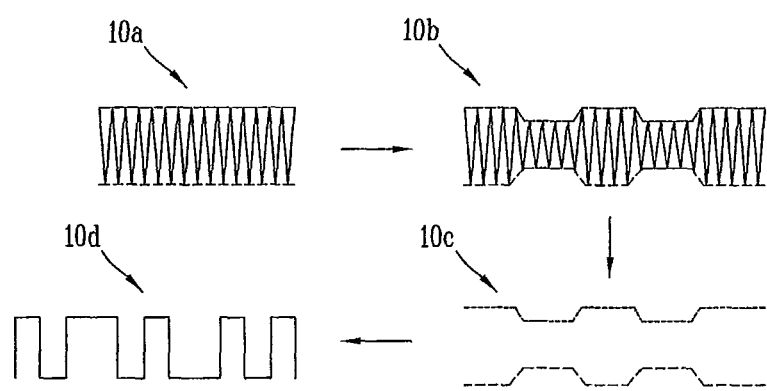

FIGS. 11A and 11B—Backscatter Modulation

FIGS. 11A and 11B are views illustrating the concept of transmitting and receiving a packet between a wireless power transmitter and an electronic device through the modulation and demodulation of a wireless power signal in transferring power in a wireless manner disclosed herein.

Referring to FIG. 11A, the wireless power signal formed by the power conversion unit 111 forms a closed-loop within a magnetic field or electromagnetic field, and therefore, when the electronic device 200 modulates the wireless power signal while receiving the wireless power signal, the wireless power transmitter 100 may detect the modulated wireless power signal. The power communications modulation/demodulation unit 113 may demodulate the detected wireless power signal, and decodes the packet from the modulated wireless power signal.

On the other hand, a modulation method used for communication between the wireless power transmitter 100 and the electronic device 200 may be amplitude modulation. As described above, the amplitude modulation method may be a backscatter modulation method in which the power communications modulation/demodulation unit 293 at the side of the electronic device 200 changes an amplitude of the wireless power signal 10a formed by the power conversion unit 111 and the Power reception control unit (or POWER RECEIVING CONTROL UNIT) 292 at the side of the wireless power transmitter 100 detects an amplitude of the modulated wireless power signal 10b.

Specifically, further referring to FIG. 11B, the Power reception control unit (or POWER RECEIVING CONTROL UNIT) 292 at the side of the electronic device 200 modulates the wireless power signal 10a received through the power receiving unit 291 by changing a load impedance within the power communications modulation/demodulation unit 293. The Power reception control unit (or POWER RECEIVING CONTROL UNIT) 292 modulates the wireless power signal 10a to include a packet including a power control message to be transmitted to the wireless power transmitter 100.

Then, the power transmission control unit 112 at the side of the wireless power transmitter 100 demodulates the modulated wireless power signal 10b through an envelope detection process, and decodes the detected signal 10c into digital data 10d. The demodulation process detects a current or voltage flowing into the power conversion unit 111 to be classified into two states, a HI phase and a LO phase, and acquires a packet to be transmitted by the electronic device 200 based on digital data classified according to the states.

Hereinafter, a process of allowing the wireless power transmitter 100 to acquire a power control message to be transmitted by the electronic device 200 from the demodulated digital data will be described.

Figure 12A:
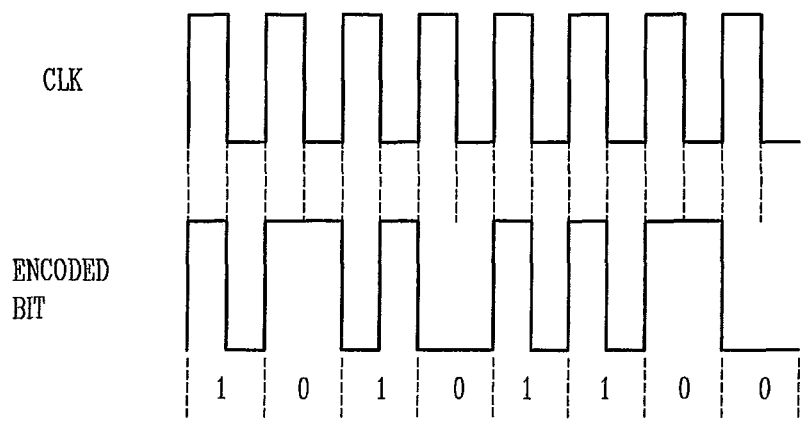
FIGS. 12A and 12B are views illustrating a method of showing data bits and byte constituting a power control message provided by the wireless power transmitter 100.
Figure 12B:
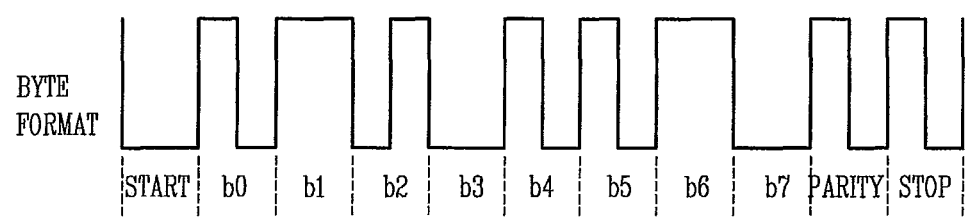

FIGS. 12A and 12B—Bit Encoding, Byte Format

FIGS. 12A and 12B are views illustrating a method of showing data bits and byte constituting a power control message provided by the wireless power transmitter 100.

Referring to FIG. 12A, the power transmission control unit 112 detects an encoded bit using a clock signal (CLK) from an envelope detected signal. The detected encoded bit is encoded according to a bit encoding method used in the modulation process at the side of the electronic device 200. The bit encoding method may correspond to any one of non-return to zero (NRZ) and bi-phase encoding.

For instance, the detected bit may be a differential bi-phase (DBP) encoded bit. According to the DBP encoding, the Power reception control unit (or POWER RECEIVING CONTROL UNIT) 292 at the side of the electronic device 200 is allowed to have two state transitions to encode data bit 1, and to have one state transition to encode data bit 0. In other words, data bit 1 may be encoded in such a manner that a transition between the HI state and LO state is generated at a rising edge and falling edge of the clock signal, and data bit 0 may be encoded in such a manner that a transition between the HI state and LO state is generated at a rising edge of the clock signal.

On the other hand, the power transmission control unit 112 may acquire data in a byte unit using a byte format constituting a packet from a bit string detected according to the bit encoding method. For instance, the detected bit string may be transferred by using an 11-bit asynchronous serial format as illustrated in FIG. 12B. In other words, the detected bit may include a start bit indicating the beginning of a byte and a stop bit indicating the end of a byte, and also include data bits (b0 to b7) between the start bit and the stop bit. Furthermore, it may further include a parity bit for checking an error of data. The data in a byte unit constitutes a packet including a power control message.

Figure 13:
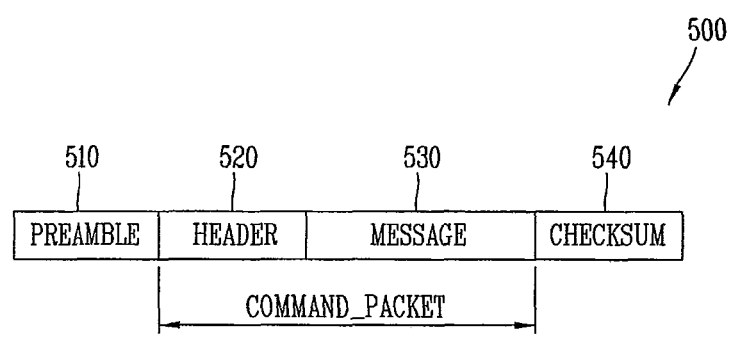
FIG. 13 is a view illustrating a packet including a power control message used in a contactless (wireless) power transfer method according to the embodiments disclosed herein.

FIG. 13—Packet Format

FIG. 13 is a view illustrating a packet including a power control message used in a contactless power transfer method according to the embodiments disclosed herein.

The packet 500 may include a preamble 510, a header 520, a message 530, and a checksum 540.

The preamble 510 may be used to perform synchronization with data received by the wireless power transmitter 100 and detect the start bit of the header 520. The preamble 510 may be configured to repeat the same bit. For instance, the preamble 510 may be configured such that data bit 1 according to the DBP encoding is repeated eleven to twenty five times.

The header 520 may be used to indicate a type of the packet 500. A size of the message 530 and the kind thereof may be determined based on a value indicated by the header 520. The header 520 is a value having a predetermined size to be positioned subsequent to the preamble 510. For instance, the header 520 may be a byte in size.

The message 530 may be configured to include data determined based on the header 520. The message 530 has a predetermined size according to the kind thereof.

The checksum 540 may be used to detect an error that can be occurred in the header 520 and the message 530 while transmitting a power control message. The header 520 and the message 530 excluding the preamble 510 for synchronization and the checksum 540 for error checking may be referred to as command-packet.

Figure 14:
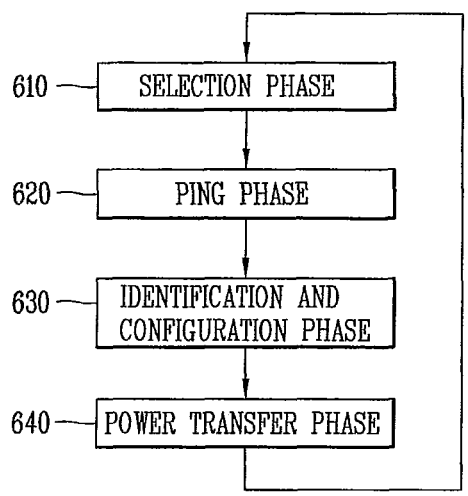
FIG. 14 is a view illustrating the operation phases of the wireless power transmitter 100 and electronic device 200 according to the embodiments disclosed herein.

FIG. 14—Operation Phases

Hereinafter, description will be given of operation phases of the wireless power transmitter 100 and the electronic device 200.

FIG. 14 illustrates the operation phases of the wireless power transmitter 100 and electronic device 200 according to the embodiments disclosed herein. Furthermore, FIGS. 15 through 20 illustrates the structure of packets including a power control message between the wireless power transmitter 100 and electronic device 200.

Referring to FIG. 14, the operation phases of the wireless power transmitter 100 and the electronic device 200 for wireless power transfer may be divided into a selection phase (state) 610, a ping phase 620, an identification and configuration phase 630, and a power transfer phase 640.

The wireless power transmitter 100 detects whether or not objects exist within a range that the wireless power transmitter 100 can transmit power in a wireless manner in the selection state 610, and the wireless power transmitter 100 sends a detection signal to the detected object and the electronic device 200 sends a response to the detection signal in the ping state 620.

Furthermore, the wireless power transmitter 100 identifies the electronic device 200 selected through the previous states and acquires configuration information for power transmission in the identification and configuration state 630. The wireless power transmitter 100 transmits power to the electronic device 200 while controlling power transmitted in response to a control message received from the electronic device 200 in the power transfer state 640.

Hereinafter, each of the operation phases will be described in detail.

1) Selection State

The wireless power transmitter 100 in the selection state 610 performs a detection process to select the electronic device 200 existing within a detection area. The detection area, as described above, refers to a region in which an object within the relevant area can affect on the characteristic of the power of the power conversion unit 111. Compared to the ping state 620, the detection process for selecting the electronic device 200 in the selection state 610 is a process of detecting a change of the power amount for forming a wireless power signal in the power conversion unit at the side of the wireless power transmitter 100 to check whether any object exists within a predetermined range, instead of the scheme of receiving a response from the electronic device 200 using a power control message. The detection process in the selection state 610 may be referred to as an analog ping process in the aspect of detecting an object using a wireless power signal without using a packet in a digital format in the ping state 620 which will be described later.

The wireless power transmitter 100 in the selection state 610 can detect that an object comes in or out within the detection area. Furthermore, the wireless power transmitter 100 can distinguish the electronic device 200 capable of transferring power in a wireless manner from other objects (for example, a key, a coin, etc.) among objects located within the detection area.

As described above, a distance that can transmit power in a wireless manner may be different according to the inductive coupling method and resonance coupling method, and thus the detection area for detecting an object in the selection state 610 may be different from one another.

First, in case where power is transmitted according to the inductive coupling method, the wireless power transmitter 100 in the selection state 610 can monitor an interface surface (not shown) to detect the alignment and removal of objects.

Furthermore, the wireless power transmitter 100 may detect the location of the electronic device 200 placed on an upper portion of the interface surface. As described above, the wireless power transmitter 100 formed to include one or more transmitting coils may perform the process of entering the ping state 620 in the selection state 610, and checking whether or not a response to the detection signal is transmitted from the object using each coil in the ping state 620 or subsequently entering the identification state 630 to check whether identification information is transmitted from the object. The wireless power transmitter 100 may determine a coil to be used for contactless power transfer based on the detected location of the electronic device 200 acquired through the foregoing process.

Furthermore, when power is transmitted according to the resonance coupling method, the wireless power transmitter 100 in the selection state 610 can detect an object by detecting that any one of a frequency, a current and a voltage of the power conversion unit is changed due to an object located within the detection area.

On the other hand, the wireless power transmitter 100 in the selection state 610 may detect an object by at least any one of the detection methods using the inductive coupling method and resonance coupling method. The wireless power transmitter 100 may perform an object detection process according to each power transmission method, and subsequently select a method of detecting the object from the coupling methods for contactless power transfer to advance to other states 620, 630, 640.

On the other hand, for the wireless power transmitter 100, a wireless power signal formed to detect an object in the selection state 610 and a wireless power signal formed to perform digital detection, identification, configuration and power transmission in the subsequent states 620, 630, 640 may have a different characteristic in the frequency, strength, and the like. It is because the selection state 610 of the wireless power transmitter 100 corresponds to an idle state for detecting an object, thereby allowing the wireless power transmitter 100 to reduce consumption power in the idle state or generate a specialized signal for effectively detecting an object.

2) Ping State

The wireless power transmitter 100 in the ping state 620 performs a process of detecting the electronic device 200 existing within the detection area through a power control message. Compared to the detection process of the electronic device 200 using a characteristic of the wireless power signal and the like in the selection state 610, the detection process in the ping state 620 may be referred to as a digital ping process.

The wireless power transmitter 100 in the ping state 620 forms a wireless power signal to detect the electronic device 200, modulates the wireless power signal modulated by the electronic device 200, and acquires a power control message in a digital data format corresponding to a response to the detection signal from the modulated wireless power signal. The wireless power transmitter 100 may receive a power control message corresponding to the response to the detection signal to recognize the electronic device 200 which is a subject of power transmission.

The detection signal formed to allowing the wireless power transmitter 100 in the ping state 620 to perform a digital detection process may be a wireless power signal formed by applying a power signal at a specific operating point for a predetermined period of time. The operating point may denote a frequency, duty cycle, and amplitude of the voltage applied to the transmitting (Tx) coil. The wireless power transmitter 100 may generate the detection signal generated by applying the power signal at a specific operating point for a predetermined period of time, and attempt to receive a power control message from the electronic device 200.

Figure 15:
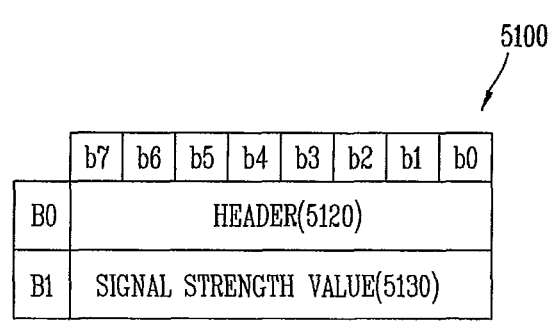

On the other hand, the power control message corresponding to a response to the detection signal may be a message indicating a strength of the wireless power signal received by the electronic device 200. For example, the electronic device 200 may transmit a signal strength packet 5100 including a message indicating the received strength of the wireless power signal as a response to the detection signal as illustrated in FIG. 15. The packet 5100 may include a header 5120 for notifying a packet indicating the signal strength and a message 5130 indicating a strength of the power signal received by the electronic device 200. The strength of the power signal within the message 5130 may be a value indicating a degree of inductive coupling or resonance coupling for power transmission between the wireless power transmitter 100 and the electronic device 200.

The wireless power transmitter 100 may receive a response message to the detection signal to find the electronic device 200, and then extend the digital detection process to enter the identification and configuration state 630. In other words, the wireless power transmitter 100 maintains the power signal at a specific operating point subsequent to finding the electronic device 200 to receive a power control message required in the identification and configuration state 630.

However, if the wireless power transmitter 100 is not able to find the electronic device 200 to which power can be transferred, then the operation phase of the wireless power transmitter 100 will be returned to the selection state 610.

3) Identification and Configuration State

The wireless power transmitter 100 in the identification and configuration state 630 may receive identification information and/or configuration information transmitted by the electronic device 200, thereby controlling power transmission to be effectively carried out.

The electronic device 200 in the identification and configuration state 630 may transmit a power control message including its own identification information. For this purpose, the electronic device 200, for instance, may transmit an identification packet 5200 including a message indicating the identification information of the electronic device 200 as illustrated in FIG. 16A. The packet 5200 may include a header 5220 for notifying a packet indicating identification information and a message 5230 including the identification information of the electronic device. The message 5230 may include information (2531 and 5232) indicating a version of the contract for contactless power transfer, information 5233 for identifying a manufacturer of the electronic device 200, information 5234 indicating the presence or absence of an extended device identifier, and a basic device identifier 5235. Furthermore, if it is displayed that an extended device identifier exists in the information 5234 indicating the presence or absence of an extended device identifier, then an extended identification packet 5300 including the extended device identifier as illustrated in FIG. 16B will be transmitted in a separate manner. The packet 5300 may include a header 5320 for notifying a packet indicating an extended device identifier and a message 5330 including the extended device identifier. When the extended device identifier is used as described above, information based on the manufacturer's identification information 5233, the basic device identifier 5235 and the extended device identifier 5330 will be used to identify the electronic device 200.

Figure 17:
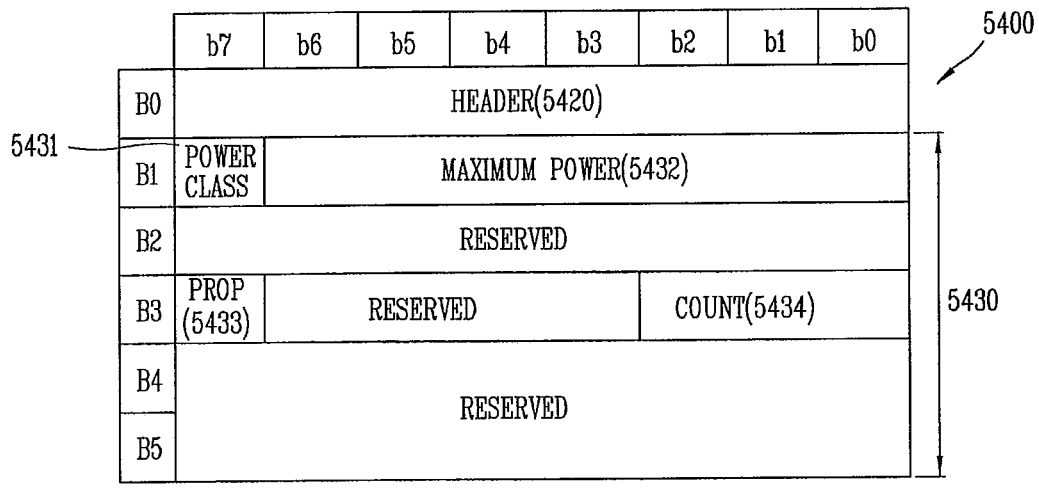

The electronic device 200 may transmit a power control message including information on expected maximum power in the identification and configuration state 630. To this end, the electronic device 200, for instance, may transmit a configuration packet 5400 as illustrated in FIG. 17. The packet may include a header 5420 for notifying that it is a configuration packet and a message 5430 including information on the expected maximum power. The message 5430 may include power class 5431, information 5432 on expected maximum power, an indicator 5433 indicating a method of determining a current of a main cell at the side of the wireless power transmitter, and the number 5434 of optional configuration packets. The indicator 5433 may indicate whether or not a current of the main cell at the side of the wireless power transmitter is determined as specified in the contract for wireless power transfer.

Meanwhile, the electronic device 200 according to the exemplary embodiments may transmit a power control message, which includes required power information thereof and associated profile information, to the wireless power transmitter 100. In some exemplary embodiments, the required power information related to the electronic device 200 or the profile information may be transmitted by being included in the configuration packet 5400 as illustrated in FIG. 17. Alternatively, the required power information related to the electronic device 200 or the profile information may be transmitted by being included in a separate packet for configuration.

On the other hand, the wireless power transmitter 100 may generate a power transfer contract which is used for power charging with the electronic device 200 based on the identification information and/or configuration information. The power transfer contract may include the limits of parameters determining a power transfer characteristic in the power transfer state 640.

The wireless power transmitter 100 may terminate the identification and configuration state 630 and return to the selection state 610 prior to entering the power transfer state 640. For instance, the wireless power transmitter 100 may terminate the identification and configuration state 630 to find another electronic device that can receive power in a wireless manner.

4) Power Transfer State

The wireless power transmitter 100 in the power transfer state 640 transmits power to the electronic device 200.

Figure 18:
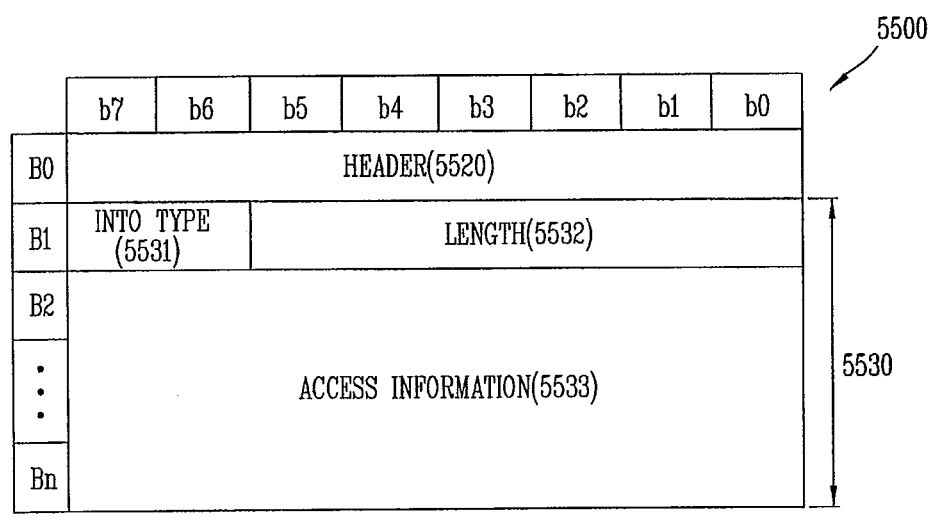

The wireless power transmitter 100 may receive a power control message from the electronic device 200 while transferring power, and control a characteristic of the power applied to the transmitting coil in response to the received power control message. For example, the power control message used to control a characteristic of the power applied to the transmitting coil may be included in a control error packet 5500 as illustrated in FIG. 18. The packet 5500 may include a header 5520 for notifying that it is a control error packet and a message 5530 including a control error value. The wireless power transmitter 100 may control the power applied to the transmitting coil according to the control error value. In other words, a current applied to the transmitting coil may be controlled so as to be maintained if the control error value is "0", reduced if the control error value is a negative value, and increased if the control error value is a positive value.

The wireless power transmitter 100 may monitor parameters within a power transfer contract generated based on the identification information and/or configuration information in the power transfer state 640. As a result of monitoring the parameters, if power transmission to the electronic device 200 violates the limits included in the power transfer contract, then the wireless power transmitter 100 may cancel the power transmission and return to the selection state 610.

The wireless power transmitter 100 may terminate the power transfer state 640 based on a power control message transferred from the electronic device 200.

For example, if the charging of a battery has been completed while charging the battery using power transferred by the electronic device 200, then a power control message for requesting the suspension of wireless power transfer will be transferred to the wireless power transmitter 100. In this case, the wireless power transmitter 100 may receive a message for requesting the suspension of the power transmission, and then terminate wireless power transfer, and return to the selection state 610.

For another example, the electronic device 200 may transfer a power control mess age for requesting renegotiation or reconfiguration to update the previously generated power transfer contract. The electronic device 200 may transfer a message for requesting the renegotiation of the power transfer contract when it is required a larger or smaller amount of power than the currently transmitted power amount. In this case, the wireless power transmitter 100 may receive a message for requesting the renegotiation of the power transfer contract, and then terminate contactless power transfer, and return to the identification and configuration state 630.

To this end, a message transmitted by the electronic device 200, for instance, may be an end power transfer packet 5600 as illustrated in FIG. 19. The packet 5600 may include a header 5620 for notifying that it is an end power transfer packet and a message 5630 including an end power transfer code indicating the cause of the suspension. The end power transfer code may indicate any one of charge complete, internal fault, over temperature, over voltage, over current, battery failure, reconfigure, no response, and unknown error.

Wireless Power Transfer in Many-to-One Communication

Hereinafter, a wireless power transfer in a many-to-one communication will be described.

Especially, the technology disclosed herein is a wireless (contactless) power transfer method associated with a wireless power control method, namely, a method for controlling power transferred from a wireless power transmitter for optimal power transfer when a plurality of wireless power receivers are present.

First, the many-to-one communication may indicate a method in which one wireless power transmitter (Tx) communicates with a plurality of wireless power receivers (Rx).

The many-to-one communication may be implemented by a unidirectional communication method and a bidirectional communication method.

The unidirectional communication may be a method in which only a wireless power receiver transmits a required message to a wireless power transmitter. To this end, the wireless power receiver may modulate a wireless power signal, which has been formed by the wireless power transmitter, to transmit a required message (or packet) to the wireless power transmitter.

The bidirectional communication may be a method in which both the wireless power transmitter and the wireless power receiver are able to exchange required messages with each other. Here, each of the wireless power transmitter and the wireless power receiver may include a modulation/demodulation unit, and may modulate the wireless power signal through the modulation/demodulation unit such that the required message can be included in a wireless power signal.

In view of a wireless power transfer, the power control method may indicate a method for controlling a quantity (amount) of power transmitted by the wireless power transmitter based on a control error.

The control error may be generated based on various references. For example, the control error may indicate a value obtained by subtracting a quantity of power, which a wireless power receiver is actually receiving from a wireless power transmitter, from a quantity of power desired by the wireless power receiver. In addition, it may be obvious to a person skilled in the art that the control error can be generated based on various references.

Figure 20A:
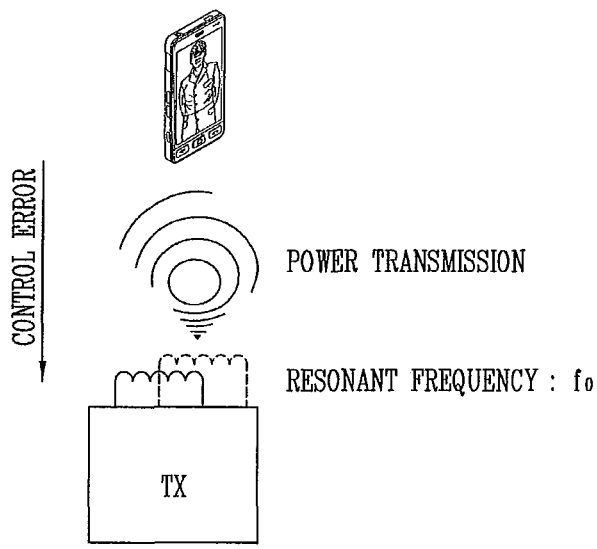
FIG. 20A is a view illustrating a wireless power transfer method based on a control error in a many-to-one communication.

FIG. 20A illustrates the wireless power transfer method (or wireless power controlling method) based on the control error in a one-to-one communication.

Referring to FIG. 20A, one wireless power transmitter Tx is transmitting a wireless power signal, which has a resonant frequency of f0, to one wireless power receiver Rx.

In this case, the wireless power receiver Rx may detect (or generate), as a control error, a value obtained by subtracting a quantity of power, which it is actually receiving, from a target quantity of power (or a quantity of power that the wireless power receiver desires to receive).

The wireless power receiver Rx may transmit the control error to the wireless power transmitter Tx.

The wireless power transmitter Tx may control the quantity of wireless power, which is transferred to the wireless power receiver, based on the control error.

For example, the wireless power transmitter Tx may control the quantity of wireless power such that the control error can be lower than a specific value (for example, 1). Also, the wireless power transmitter Tx may control the quantity of wireless power such that the control error can be converged into '0' (or a value close to '0').

The control of the quantity of wireless power may be implemented by adjusting (or setting) a transmission parameter of the wireless power signal formed by the wireless power transmitter Tx.

For example, the transmission parameter may be a frequency (or resonant frequency) of the wireless power signal. The wireless power transmitter Tx may adjust the quantity of wireless power transferred by adjusting the frequency of the wireless power signal.

Figure 20B:
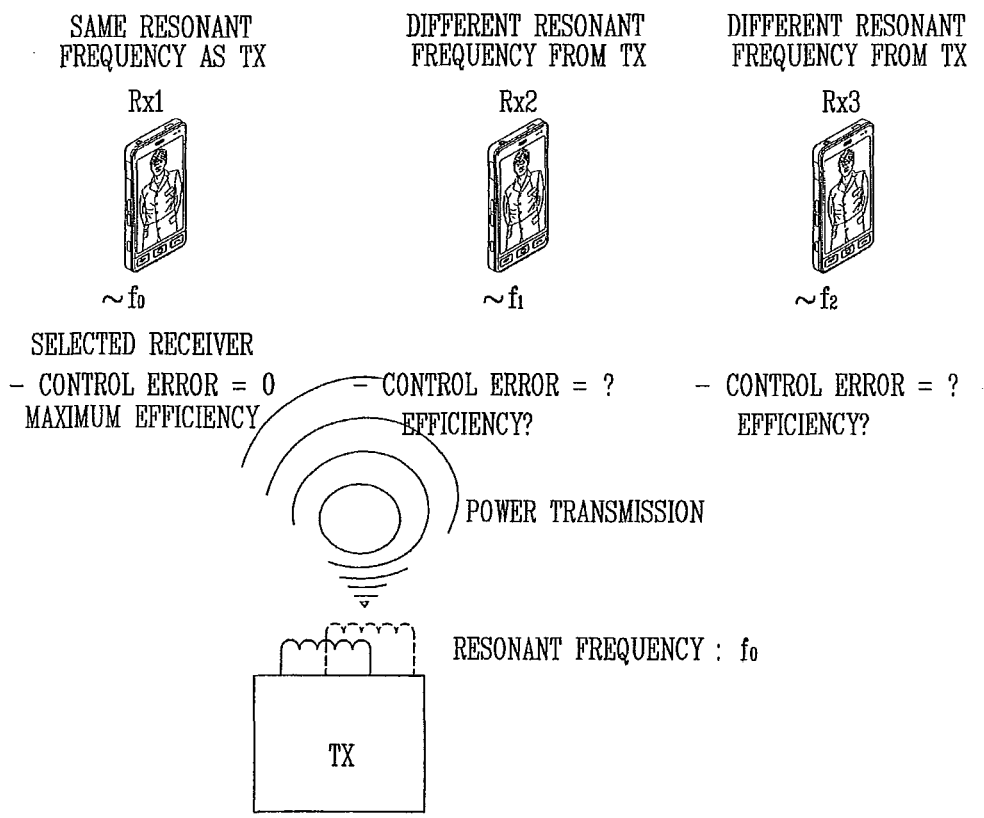
FIG. 20B is an exemplary view illustrating the wireless power transfer method in the many-to-one communication.

FIG. 20B is an exemplary view illustrating a wireless power controlling method in a many-to-one communication.

Referring to FIG. 20B, one wireless power transmitter Tx may transfer power in a wireless manner to a plurality of wireless power receivers Rx1 to Rx3 by generating (forming) a wireless power signal having a resonant frequency of f0.

As illustrated in FIG. 20A, the plurality of wireless power receivers Rx1 to Rx3 may receive power in a wireless manner by receiving the wireless power signal from the wireless power transmitter Tx, and detect a control error to transmit to the wireless power transmitter Tx.

Here, the wireless power transmitter Tx should control the respective to quantities of wireless power with respect to the plurality of wireless power receivers Rx1 to Rx3 based on control errors (totally three control error information) acquired from the plurality of wireless power receivers Rx1 to Rx3, respectively.

Here, if the quantity of wireless power is controlled based on a control error acquired from only one wireless power receiver (for example, Rx1), the control error for the Rx1 may be adjustable, but the control errors for the other wireless power receivers Rx2 and Rx3 may not appropriately be adjusted.

Hereinafter, description will be given of a wireless power receiver capable of changing a resonant frequency and a resonant frequency changing method thereof, with reference to FIGS. 21 to 29.

A wireless power receiver capable of changing a resonant frequency and a resonant frequency changing method thereof may be applicable to a wireless power system for transmitting and receiving power in a wireless manner by magnetic resonance (or resonance coupling).

Especially, a technology disclosed in this specification may propose a wireless power receiver, capable of modulating a driving frequency (or resonant frequency) through physical and electrical changes of passive devices in a wireless power transfer using a magnetic resonance method, and a frequency changing method thereof.

Description of General Wireless Power System

A contactless wireless charging method is an innovative energy transfer conception, capable of electromagnetically transferring energy with eliminating wires (cables) from the conventional method, which transfers energy via a wire and uses it as power of an electronic device.

The contactless wireless transfer methods may include a method using magnetic induction. According to the magnetic induction, when a power transmitting unit generates a magnetic field by use of a coil, a device locates its coil at a position adjacent to the coil of the transmitting unit to acquire power with sharing the magnetic field.

This method has already been utilized in devices, such as electric toothbrushes, wireless coffee ports and the like that are frequently used in real lives.

However, two coils have to be adjacent to each other, and an alignment direction is also an important element for energy transfer efficiency. Therefore, the method using the magnetic induction is subject to a limitation of an applicable range.

An energy transfer method using magnetic resonance is a method of allowing energy to be transferred from a transmitting unit to a receiving unit by matching a resonant frequency of the transmitting unit with a resonant frequency of the receiving unit. Therefore, it may be the most ideal energy transfer method at a short distance (<1 m) if minimizing energy loss.

Figure 21:
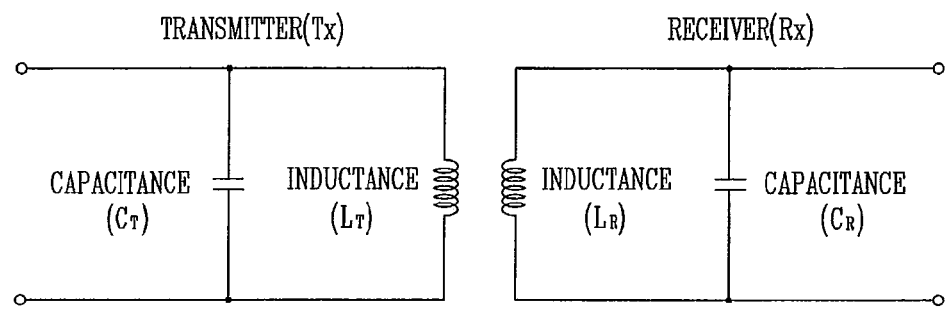
FIG. 21 is an exemplary view illustrating a general wireless power system.

FIG. 21 is an exemplary view illustrating a general wireless power system.

Referring to FIG. 21, a transmitting unit ($T_x$) of a wireless power transmitter may include a transmitting side resonant circuit (including a capacitor $C_t$ and an inductor $L_T$), and a receiving unit ($R_x$) of a wireless power receiver may include a receiving side resonant circuit (a capacitor $C_R$ and an inductor $L_R$).

In accordance with one exemplary embodiment, the transmitting unit Tx may be implemented by being included in the aforementioned power conversion unit 111. The receiving unit Rx may also be implemented by being included in the aforementioned power receiving unit 291.

A wireless power system using magnetic resonance may transmit and receive power in a wireless manner based on a resonance phenomenon between the transmitting side resonant circuit and the receiving side resonant circuit.

In more detail, the transmitting unit Tx may generate a wireless power signal based on the resonance phenomenon, and the receiving unit Rx may receive power in a wireless manner by reception of the wireless power signal.

In this case, a driving frequency (or resonant frequency) at a circuit (or resonant circuit) having an inductor and a capacitor coupled to each other may be defined by the following Equations 2 and 3.

$$f_T\left(\begin{array}{c}\text{Transmitting}\\\text{side}\end{array}\right) = \frac{1}{2\pi}\sqrt{\frac{1}{L_T C_T}} \quad \text{[Equation 2]}$$

$$f_T\left(\begin{array}{c}\text{Receiving}\\\text{side}\end{array}\right) = \frac{1}{2\pi}\sqrt{\frac{1}{L_R C_R}} \quad \text{[Equation 2]}$$

For the wireless charging method using the magnetic resonance, in order to equally maintain the frequencies of the transmitting unit and the receiving unit, an inductance value and a capacitance value are adjusted at the beginning. When a distance between the transmitting unit and the receiving unit changes from several cm to several tens of cm, a Quality factor (Q) value which affects a maximum transfer efficiency changes. Also, when the transmitting unit and the receiving unit approaches each other within several cm in distance, a maximum transmittable frequency may change.

Hence, the driving frequency has to be modulated by changing a capacitance value and an inductance value of a configured circuit according to a wireless power transfer environment.

Here, the capacitor and the inductor are generally passive devices, so it may be difficult to actively change their values.

A technology according to the present disclosure may propose physical and circuital configurations, capable of adjusting an inductance value (L) and a capacitance value (C) of the transmitting unit or the receiving unit.

Description of Wireless Power System According to Exemplary Embodiments

A wireless power system in accordance with exemplary embodiments may include a wireless power transmitter 100 for generating a wireless power signal based on a resonance phenomenon, and a wireless power receiver 200 for receiving power in a wireless manner by receiving the wireless power signal.

A wireless power transmitter in accordance with exemplary embodiments disclosed herein may include a power conversion unit having a transmitting side resonant circuit provided with at least one inductor and at least one capacitor, and configured to generate a wireless power signal based on a resonance phenomenon between the transmitting side resonant circuit and a receiving side resonant circuit of a wireless power receiver, and a power transmission control unit (power transmission controller) for controlling the power conversion unit to change a connection between the at least one inductor and the at least one capacitor so as to change a resonant frequency corresponding to the wireless power signal.

Also, a wireless power receiver in accordance with exemplary embodiments disclosed herein may include a power receiving unit having a receiving side resonant circuit provided with at least one inductor and at least one capacitor, and configured to receive a wireless power signal generated based on a resonance phenomenon between the receiving side resonant circuit and a transmitting side resonant circuit of a wireless power transmitter, and a power reception control unit (power reception controller) for controlling the power receiving unit to change a connection between the at least one inductor and the at least one capacitor so as to change a resonant frequency corresponding to the wireless power signal.

Figure 22:
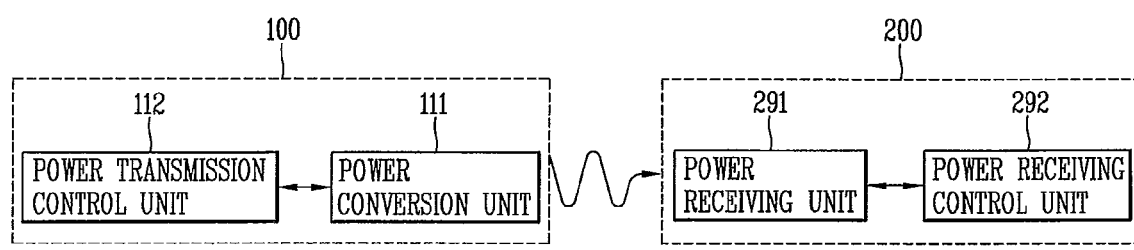
FIG. 22 is a view illustrating a configuration of a wireless power system in accordance with exemplary embodiments of the present disclosure.

FIG. 22 is a view illustrating a configuration of a wireless power system in accordance with exemplary embodiments of the present disclosure.

As illustrated in FIG. 22, a wireless power system in accordance with exemplary embodiments may include a wireless power transmitter 100 for generating a wireless power signal based on a resonance phenomenon, and a wireless power receiver 200 for receiving power in a wireless manner by receiving the wireless power signal.

In accordance with one exemplary embodiment, the wireless power transmitter 100 may include a power conversion unit 111 and a power transmission control unit 112.

The power conversion unit 111, as aforementioned, may convert power, which is supplied from a transmitting side power supply unit 190 into a wireless power signal, transferring to the wireless power receiver (or electronic device) 200. The wireless power signal transferred by the power conversion unit 111 may be generated in the form of a magnetic field or electromagnetic field having an oscillation characteristic.

In one exemplary embodiment, the power conversion unit 111 may include a transmitting side resonant circuit and an inverter 1112.

The transmitting side resonant circuit may be provided with at least one inductor and at least one capacitor. Here, the at least one inductor may be a passive device corresponding to the aforementioned transmitting coil 1111a.

The transmitting coil 1111a, as aforementioned, may form a magnetic field corresponding to a wireless power signal in response to a change in current. In some exemplary embodiments, the transmitting coil 1111a may be implemented as a planar spiral type. In other exemplary embodiments, the transmitting coil 1111a may alternatively be implemented as a cylindrical solenoid type.

The inverter 1112 may transform DC input obtained from the power supply unit 190 into AC waveform. The AC current transformed by the inverter 1112 may be used to drive a resonant circuit having the transmitting coil 1111a and a capacitor (not shown). Accordingly, a magnetic field is formed from the transmitting coil 1111a. With the magnetic field formed, a wireless power signal may be transferred from the wireless power transmitter 100 to the wireless power receiver 200.

In one exemplary embodiment, the AC waveform generated by the inverter 1112 may be a carrier signal. The carrier signal may then be used to drive the resonant circuit, thereby generating the wireless power signal from the transmitting coil 1111a. That is, the wireless power signal may be generated based on the carrier signal.

In one exemplary embodiment, the power conversion unit 111 may generate a wireless power signal based on a resonance phenomenon between the transmitting side resonant circuit and the receiving side resonant circuit of the wireless power receiver.

Here, the transmitting side resonant circuit may be driven by the carrier signal. That is, the power conversion unit 111 may generate the wireless power signal based on the carrier signal.

The power transmission control unit 112 may control each constituent element included in the power conversion unit 111. In some exemplary embodiments, the power transmission control unit 112 may be integrated with another control unit (not shown) which controls the wireless power transmitter 100.

In one exemplary embodiment, the power transmission control unit 112 may control the power conversion unit to change a connection between the at least one inductor and the at least one capacitor so as to change a resonant frequency corresponding to the wireless power signal.

In one exemplary embodiment, the wireless power receiver 200 may include a power receiving unit 291 and a power reception control unit 292.

The power receiving unit 291, as aforementioned, may receive power transferred in a wireless manner from the wireless power transmitter 100. The reception of the wirelessly transferred power may be achieved by receiving the wireless power signal generated by the wireless power transmitter 100.

The power receiving unit 291 may include a coil for receiving a wireless power signal transferred in the form of a magnetic field or electromagnetic field having an oscillation characteristic.

For example, the power receiving unit 291 may include, as constituent elements according to the resonance coupling method, a coil and a resonant generation circuit in which resonance phenomenon is generated by a magnetic field having a specific resonant frequency.

The coil and the resonant generation circuit may be the constituent elements corresponding to the receiving side resonant circuit. Also, the coil may be a passive device corresponding to the receiving coil 2911a.

In one exemplary embodiment, the power receiving unit 291 may include a receiving side resonant circuit provided with at least one inductor and at least one capacitor.

Also, the power receiving unit 291 may receive a wireless power signal generated based on a resonance phenomenon between the receiving side resonant circuit and the transmitting side resonant circuit of the wireless power transmitter 100.

The power reception control unit 292 may control a constituent element of the wireless power receiver 100 in order to provide a resonant frequency changing function of the wireless power system.

In one exemplary embodiment, the power reception control unit 292 may control the power receiving unit 291 to change a connection between the at least one inductor and the at least one capacitor so as to change a resonant frequency corresponding to the wireless power signal.

In one exemplary embodiment, the power receiving unit 291 may further include at least one switching device.

Here, the power reception control unit 292 may control the power receiving unit 291 to change a connection between the at least one inductor and the at least one capacitor in response to a switching operation of the switching device.

Also, in one exemplary embodiment, the power reception control unit 292 may transfer a power control message (or control message) to the wireless power transmitter 100.

The power control message may instruct the wireless power transmitter 100 to initiate or terminate a transfer of the wireless power signal. Furthermore, the power control message may instruct the wireless power transmitter 100 to adjust a characteristic of the wireless power signal.

The characteristic of the wireless power signal may indicate various signal characteristics. For example, the characteristic of the wireless power signal may indicate at least one of amplitude, phase and frequency of the wireless power signal.

Here, the frequency of the wireless power signal may correspond to a driving frequency or a resonant frequency in the wireless power system.

In some exemplary embodiments, the power reception control unit 292 may transmit the power control message via the wireless power signal.

Also, in some exemplary embodiments, the power reception control unit 292 may transmit the power control message through the aforementioned user data transmission method.

To transmit the power control message, the wireless power receiver (or electronic device) 200 may further include a power communications modulation/demodulation unit 293 electrically connected to the power receiving unit 291.

The modulation/demodulation unit 293, similar to the wireless power transmitter 100, may be used to transmit the power control message via the wireless power signal.

The modulation/demodulation unit 293 may be used as means for adjusting current and/or voltage flowing on the power conversion unit 111 of the wireless power transmitter 100.

In one exemplary embodiment, the power control message may include control error information.

Here, the control error may be generated based on at least one of a value obtained by subtracting an actually received amount of power from a target amount of power corresponding to the wireless power receiver 200, a value obtained by subtracting an actually received receiving side voltage from a target receiving side voltage (or reference voltage) corresponding to the wireless power receiver 200, a value obtained by subtracting an actually received receiving side current from a target receiving side current corresponding to the wireless power receiver 200, a value obtained by subtracting transmission efficiency upon actually receiving power in a wireless manner from a target transmission efficiency corresponding to the wireless power receiver 200, and a value obtained by subtracting a transmission gain upon actually receiving power in a wireless manner from a target transmission gain corresponding to the wireless power receiver 200.

The target receiving side voltage (or the reference voltage) may be decided based on whether or not it is a voltage which is able to cause damage on the wireless power receiver 200.

The transmission efficiency may be a ratio between transmission power of the wireless power transmitter 100 and reception power of the wireless power receiver 200. The transmission gain may be a ratio between a transmitting side voltage corresponding to the wireless power transmitter 100 and a receiving side voltage corresponding to the wireless power receiver 200. Here, the reception power may be detected based on a receiving side voltage and a receiving side current corresponding to the wireless power receiver 200.

In one exemplary embodiment, the wireless power transmitter 100 may change a frequency of the wireless power signal based on the control error.

For example, the wireless power transmitter 100 may change the frequency of the wireless power signal such that the control error can be close to '0'.

In more detail, the wireless power transmitter 100 may change the frequency of the wireless power signal such that the control error can be close to '0' within a target error range. For example, the wireless power transmitter 100 may change the frequency of the wireless power signal such that the control error can be close to '0' between ±2.

In one exemplary embodiment, the changing of the frequency of the wireless power signal may be implemented by changing a frequency (or driving frequency) of a carrier signal for driving the transmitting side resonant circuit.

For example, the wireless power transmitter 100 may change the frequency of the wireless power signal by sequentially increasing (or decreasing) the frequency of the carrier signal such that the control error can be close to '0'.

Consequently, the wireless power transmitter 100 or the wireless power receiver 200 may decide the frequency of the wireless power signal, which allows the receiving side voltage to become a target voltage.

First Exemplary Embodiment

Resonant Frequency Change by Selective Capacitor Connection

The first exemplary embodiment according to this specification may be implemented by a part or combination of configurations or steps included in the aforementioned embodiments. Hereinafter, duplicate description will be omitted for obvious explanation of the first exemplary embodiment.

A wireless power receiver in accordance with a first exemplary embodiment may include a power receiving unit having a receiving side resonant circuit provided with at least one inductor and at least one capacitor, and configured to receive a wireless power signal generated based on a resonance phenomenon between the receiving side resonant circuit and a transmitting side resonant circuit of a wireless power transmitter, and a power reception control unit (power reception controller) for controlling the power receiving unit to change a connection between the at least one inductor and the at least one capacitor so as to change a resonant frequency corresponding to the wireless power signal.

In accordance with the first exemplary embodiment, the power receiving unit may further include at least one switching device. The power reception control unit may control the power receiving unit to change a connection between the at least one inductor and the at least one capacitor in response to a switching operation of the switching device.

In accordance with the first exemplary embodiment, the power receiving unit may include a capacitor part having n capacitors, a switching part having n switching devices, and an inductor. The power reception control unit may control the power receiving unit to selectively connect at least one of the n capacitors to the inductor in parallel to each other in response to the switching operation of the switching device.

A wireless power transmitter in accordance with a first exemplary embodiment may include a power conversion unit having a transmitting side resonant circuit provided with at least one inductor and at least one capacitor, and configured to generate a wireless power signal based on a resonance phenomenon between the transmitting side resonant circuit and a receiving side resonant circuit of a wireless power receiver, and a power transmission control unit (power transmission controller) for controlling the power conversion unit to change a connection between the at least one inductor and the at least one capacitor so as to change a resonant frequency corresponding to the wireless power signal.

In accordance with the first exemplary embodiment, the power conversion unit may include a capacitor part having n capacitors, a switching part having n switching devices, and an inductor. The power transmission control unit may control the power conversion unit to selectively connect at least one of the n capacitors to the inductor in parallel to each other in response to the switching operation of the switching device.

Figure 23:
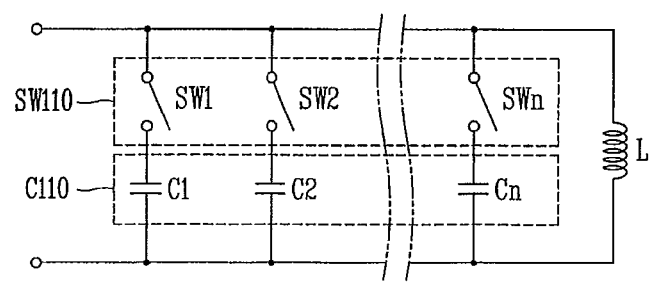
FIG. 23 is an exemplary view illustrating a resonant frequency changing method in accordance with a first exemplary embodiment.

FIG. 23 is an exemplary view illustrating a resonant frequency changing method in accordance with a first exemplary embodiment.

As illustrated in FIG. 23, a transmitting side resonant circuit of the wireless power transmitter 100 or a receiving side resonant circuit of the wireless power receiver 100 may include a capacitor part C110 having n capacitors, a switching part SW110 having n switching devices, and an inductor L.

The power transmission control unit 112 or the power reception control unit 292 (hereinafter, referred to as a controller) may control the switching part SW110 to perform a switching operation.

In response to the switching operation, at least one of the n capacitors may be selectively connected to the inductor in parallel to each other.

That is, the controller may selectively switch on or off at least one of switches from a first switch SW1 to $n^{th}$ switch SWn. Accordingly, the controller may change (or adjust) a driving frequency (or resonant frequency) of the resonant circuit.

The resonant frequency of the resonant circuit may be decided by the following Equation 4.

$$f_n = \frac{1}{2\pi}\sqrt{\frac{1}{LC_n}} \quad \text{[Equation 4]}$$

Accordingly, upon decision of the number of resonant frequencies which may change according to a distance between a receiver and a transmitter, the wireless power system may operate with a resonant frequency having optimized efficiency by virtue of the switching.

Second Exemplary Embodiment

Resonant Frequency Change by Selective Inductor Connection

The second exemplary embodiment according to this specification may be implemented by a part or combination of configurations or steps included in the aforementioned embodiments. Hereinafter, duplicate description will be omitted for obvious explanation of the second exemplary embodiment.

A wireless power receiver in accordance with a second exemplary embodiment may include a power receiving unit having a receiving side resonant circuit provided with at least one inductor and at least one capacitor, and configured to receive a wireless power signal generated based on a resonance phenomenon between the receiving side resonant circuit and a transmitting side resonant circuit of a wireless power transmitter, and a power reception control unit (power reception controller) for controlling the power receiving unit to change a connection between the at least one inductor and the at least one capacitor so as to change a resonant frequency corresponding to the wireless power signal.

In accordance with the second exemplary embodiment, the power receiving unit may further include at least one switching device. The power reception control unit may control the power receiving unit to change a connection between the at least one inductor and the at least one capacitor in response to a switching operation of the switching device.

In accordance with the second exemplary embodiment, the power receiving unit may include an inductor part having n inductors, a switching part having n switching devices and a capacitor. The power reception control unit may control the power receiving unit to selectively connect at least one of the n inductors to the capacitor in series in response to a switching operation of the switching device.

A wireless power transmitter in accordance with the second exemplary embodiment may include a power conversion unit having a transmitting side resonant circuit provided with at least one inductor and at least one capacitor, and configured to generate a wireless power signal based on a resonance phenomenon between the transmitting side resonant circuit and a receiving side resonant circuit of a wireless power receiver, and a power transmission control unit (power transmission controller) for controlling the power conversion unit to change a connection between the at least one inductor and the at least one capacitor so as to change a resonant frequency corresponding to the wireless power signal.

In accordance with the second exemplary embodiment, the power conversion unit may include an inductor part having n inductors, a switching part having n switching devices and a capacitor. The power reception control unit may control the power receiving unit to selectively connect at least one of the n inductors to the capacitor in series in response to a switching operation of the switching device.

Figure 24:
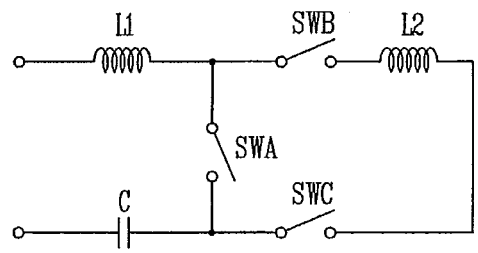
FIG. 24 is an exemplary view illustrating a resonant frequency changing method in accordance with a second exemplary embodiment.

FIG. 24 is an exemplary view illustrating a resonant frequency changing method in accordance with a second exemplary embodiment.

As illustrated in FIG. 24, the resonant circuit may include two inductors L1 and L2, three switches SWA to SWC, and one capacitor C.

The controller may drive the three switches SWA to SWC to perform a switching operation in order to change a resonant frequency corresponding to the resonant circuit.

In response to the switching operation, the resonant frequency may be selected by the following Equations 5 and 6.

$$f_1 = \frac{1}{2\pi}\sqrt{\frac{1}{L_1 C}} \quad SW_A\text{:close, } SW_B, SW_C\text{:open} \quad \text{[Equation 5]}$$

$$f_1 = \frac{1}{2\pi}\sqrt{\frac{1}{(L_1+L_2)C}} \quad SW_A\text{:open, } SW_B, SW_C\text{:close} \quad \text{[Equation 6]}$$

Figure 25:
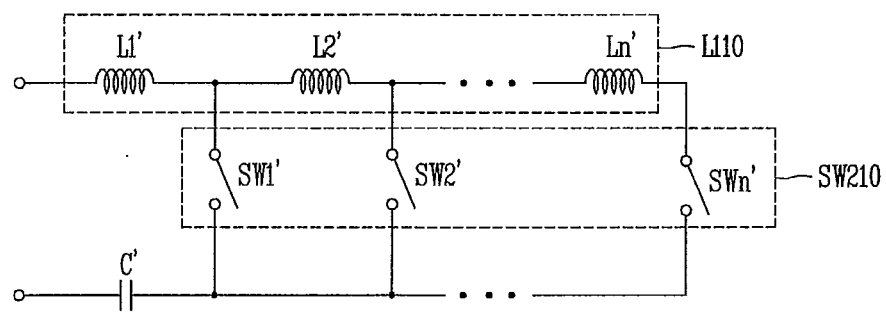
FIG. 25 an exemplary view illustrating a resonant frequency changing method in accordance with another second exemplary embodiment.

FIG. 25 an exemplary view illustrating a resonant frequency changing method in accordance with another second exemplary embodiment.

As illustrated in FIG. 25, the resonant circuit may include an inductor part L110 having n inductors, a switching part SW210 having n switching devices, and a capacitor C.

The controller may control the switching unit SW210 to perform a switching operation.

In response to the switching operation, at least one of the n inductors may be selectively connected to the capacitor in series.

That is, the controller may selectively switch on or off at least one of switches from a first switch SW1' to $n^{th}$ switch SWn'. Accordingly, the controller may change (or adjust) a driving frequency (or resonant frequency) of the resonant circuit.

The resonant frequency of the resonant circuit may be decided by the following Equation 7.

$$f'_n = \frac{1}{2\pi}\sqrt{\frac{1}{L_n C}} \qquad \text{[Equation 7]}$$

Accordingly, upon decision of the number of resonant frequencies which are to be changed by a distance between a receiver and a transmitter, the wireless power system may operate with a resonant frequency having an optimized efficiency through the switching.

Third Exemplary Embodiment

Wireless Power System Having a Plurality of Resonant Frequencies

The third exemplary embodiment according to this specification may be implemented by a part or combination of configurations or steps included in the aforementioned embodiments. Hereinafter, duplicate description will be omitted for obvious explanation of the third exemplary embodiment.

A wireless power system in accordance with a third exemplary embodiment may include a wireless power transmitter and at least one wireless power receiver.

The wireless power receiver in accordance with the third exemplary embodiment may include a power receiving unit having a receiving side resonant circuit provided with at least one inductor and at least one capacitor, and configured to receive a wireless power signal generated based on a resonance phenomenon between the receiving side resonant circuit and a transmitting side resonant circuit of the wireless power transmitter, and a power reception control unit (or power receiving control unit) for controlling the power receiving unit to change a connection between the at least one inductor and the at least one capacitor so as to change a resonant frequency corresponding to the wireless power signal.

In accordance with the third exemplary embodiment, the power receiving unit may further include at least one switching device. The power reception control unit may control the power receiving unit to change a connection between the at least one inductor and the at least one capacitor based on a switching operation of the switching device.

In accordance with the third exemplary embodiment, the power receiving unit may include a first capacitor, a second capacitor, an inductor and a switching device. The power reception control unit may control the power receiving unit to selectively connect one of the first and second capacitors to the inductor in response to a switching operation of the switching device so as to change a resonant frequency corresponding to the wireless power signal.

In accordance with the third exemplary embodiment, the power reception control unit may control the power receiving unit to connect one of the first and second capacitors to the inductor in series in response to the switching operation of the switching device.

In accordance with the third exemplary embodiment, the first capacitor may be a detection capacitor for the wireless power transmitter to detect the wireless power receiver, and the second capacitor may be a resonance capacitor for receiving wireless power transmitted (generated) based on a resonance phenomenon.

In accordance with the third exemplary embodiment, the power reception control unit may selectively connect the first capacitor to the inductor when the wireless power receiver meets a specific condition. After the wireless power receiver meets the specific condition, when a receiving side voltage of the wireless power receiver is close to a reference voltage within a specific error range, the wireless power control unit may selectively connect the second capacitor to the inductor.

In accordance with the third exemplary embodiment, the reference voltage may be decided based on whether or not it is a voltage which is able to cause damage on the wireless power receiver.

Here, the wireless power transmitter may generate a wireless power signal based on a carrier signal and operate in a resonant frequency deciding mode when the wireless power receiver meets the specific condition. Here, the resonant frequency deciding mode may be a mode of sequentially changing power wirelessly transferred based on the wireless power signal by sequentially changing a driving frequency of the carrier signal, and deciding a driving frequency corresponding to a receiving side voltage of the wireless power receiver as a resonant frequency when the receiving side voltage is close to the reference voltage within the specific error range due to the changed wireless power.

In accordance with the third exemplary embodiment, the specific error range may be ±5% of the reference voltage.

In accordance with the third exemplary embodiment, the specific condition may indicate a case where the wireless power receiver is located within a specific area, a case where a new wireless power receiver is located within the specific area, a case where the number of wireless power receivers present within the specific area changes, a case where a position of at least one wireless power receiver present within the specific area changes, or a case of receiving a request periodically or from the wireless power receiver. The specific area may be an area where the wireless power signal passes through or an area where the wireless power receiver can be detected.

In accordance with the third exemplary embodiment, the power reception control unit may control the power receiving unit to transmit a control message to the wireless power transmitter, and the wireless power transmitter may sequentially change the driving frequency based on the transmitted control message.

Here, the control message may include control error information, which indicates a voltage difference between the receiving side voltage and the reference voltage.

In accordance with the third exemplary embodiment, the wireless power transmitter may decide whether or not the receiving side voltage is close to the reference voltage within the specific error range based on the control message, and terminate (stop) the change of the driving frequency when the receiving side voltage is decided as being close to the reference voltage within the specific error range.

In accordance with the third exemplary embodiment, the wireless power transmitter may change the connection between the at least one inductor and the at least one capacitor included in the transmitting side resonant circuit so as to correspond to the change in the resonant frequency corresponding to the wireless power signal when the receiving side voltage is close to the reference voltage within the specific error range.

The wireless power transmitter in accordance with the third exemplary embodiment may include a power conversion unit having a transmitting side resonant circuit provided with at least one inductor and at least one capacitor, and configured to generate a wireless power signal based on a resonance phenomenon between the transmitting side resonant circuit and a receiving side resonant circuit of the wireless power receiver, and a power transmission control unit (or power transmitting control unit) for controlling the power conversion unit to change a connection between the at least one inductor and the at least one capacitor so as to change a resonant frequency corresponding to the wireless power signal.

In accordance with the third exemplary embodiment, the power conversion unit may generate a wireless power signal based on a carrier signal. When a wireless power receiver which wirelessly receives power based on the wireless power signal meets a specific condition, the power transmission control unit may sequentially change power wirelessly transmitted based on the wireless power signal by sequentially changing a driving frequency of the carrier signal. When a receiving side voltage of the wireless power receiver is close to the reference voltage within the specific error range due to the changed wireless power, the power transmission control unit may control the power conversion unit to terminate the sequential change of the driving frequency. The wireless power receiver may include a first capacitor, a second capacitor, an inductor and a switching device. The first capacitor may be selectively connected to the inductor when the wireless power receiver meets the specific condition. After the wireless power receiver meets the specific condition, when a receiving side voltage of the wireless power receiver is close to a reference voltage within a specific error range, the second capacitor may be selectively connected to the inductor.

In general, the wireless power system using the resonance coupling method may have a characteristic of charging simultaneously a plurality of wireless power receiving systems (or receivers) 200 in a wireless manner using one wireless power transmitting system (or transmitter) 100.

Each of the wireless power receivers (Rx) 200 may have a desirable input voltage range (or receiving side voltage range) for allowing charging with optimal efficiency, and an allowable voltage range for preventing damage on Rx front end hardware.

Upon charging the plurality of wireless power receivers (or electronic devices) 200 at the same time, the allowable voltage range for each wireless power receiver Rx and the desirable input voltage range for charging with optimal efficiency are different from each other. Hence, the wireless power transmitter Tx may need to perform power control for safely charging the plurality of wireless power receivers Rx.

As one method, the wireless power transmitter (Tx) 100 may transmit power, starting from a low level of voltage, and receive an input (for example, the control message or the control error) from each wireless power receiver (Rx) 200, selecting an appropriate level.

That is, each wireless power receiver (Rx) 200 may transmit control information (or control error information), which indicates whether the wireless power transmitter (Tx) 100 has to rise or fall the level of voltage based on an amount of power received.

In accordance with the third exemplary embodiment, the control error information may be generated based on at least one of a value obtained by subtracting an actually received amount of power from a target amount of power corresponding to the wireless power receiver 200, a value obtained by subtracting an actually received receiving side voltage from a target receiving side voltage (or reference voltage) corresponding to the wireless power receiver 200, a value obtained by subtracting an actually received receiving side current from a target receiving side current corresponding to the wireless power receiver 200, a value obtained by subtracting transmission efficiency upon actually receiving power in a wireless manner from a target transmission efficiency corresponding to the wireless power receiver 200, and a value obtained by subtracting a transmission gain upon actually receiving power in a wireless manner from a target transmission gain corresponding to the wireless power receiver 200.

When the wireless power transmitter (Tx) 100 first receives information requesting for falling a transmitted voltage from at least one of the plurality of wireless power receivers (Rx) 200, the wireless power transmitter (Tx) 100 may maintain the corresponding voltage (even if it receives a control message requesting for rising a voltage from other wireless power receivers), thereby charging the plurality of wireless power receivers.

The wireless power transmitter (Tx) 100 may perform such power control to safely charge the plurality of wireless power receivers (Rx) 200 at the same time.

While simultaneously charging the plurality of wireless power receivers (Rx) 200 according to the aforementioned power control method, when a new wireless power receiver enters a charging area, a problem may be caused in that the new wireless power receiver may immediately be exposed to a voltage level which is currently being charged.

The situation occurs due to a wireless charging being performed by a resonant frequency coupling when the new wireless power receiver enters the charging area because the wireless power transmitter and the new wireless power receiver use the same one resonant frequency.

In accordance with the third exemplary embodiment, the newly entered wireless power receiver may have a plurality of resonant frequencies (for example, two resonant frequencies) which are physically different from each other. The wireless power receiver may have a plurality of modes (or operating modes) in which it operates with each of the plurality of resonant frequencies.

The physical difference may be caused due to a change in the connection between at least one inductor and a capacitor included in the receiving side resonant circuit.

For example, when the wireless power receiver newly enters the charging area and initially operates with a first resonant frequency through a first connection between the at least one inductor and the capacitor, the wireless power receiver may operate in a detection mode. The detection mode may be a mode that the wireless power transmitter detects the wireless power receiver with the first resonant frequency.

The detection of the wireless power receiver by the wireless power transmitter may be performed in various manners. For example, the power transmission control unit 112 may detect presence of the wireless power receiver by monitoring whether or not a characteristic of a wireless power signal generated by the power conversion unit 111 is changed due to being affected by the wireless power receiver present in a detection area. Here, the activation area and the detection area may depend on a wireless power transferring method such as the inductive coupling and the resonance coupling.

Also, the wireless power transmitter may detect the wireless power receiver by receiving a control message transmitted from the wireless power receiver via a first resonant frequency. The control message, as aforementioned, may be transmitted by modulation for the wireless power signal performed by the wireless power receiver.

For example, when the wireless power receiver operates with a second operating frequency by changing the connection between the at least one inductor and the capacitor from the first connection to a second connection after completion of the detection mode, the wireless power receiver may operate in a wireless power receiving mode (or charging mode).

The wireless power receiving mode (or charging mode) may be an operating mode that the wireless power transmitter transmits (or transfers) power in a wireless manner by generating a wireless power signal.

Hereinafter, description will be given of a wireless power receiver (or wireless power system) having a plurality of resonant frequencies with reference to FIGS. 26 to 29.

Figure 26:
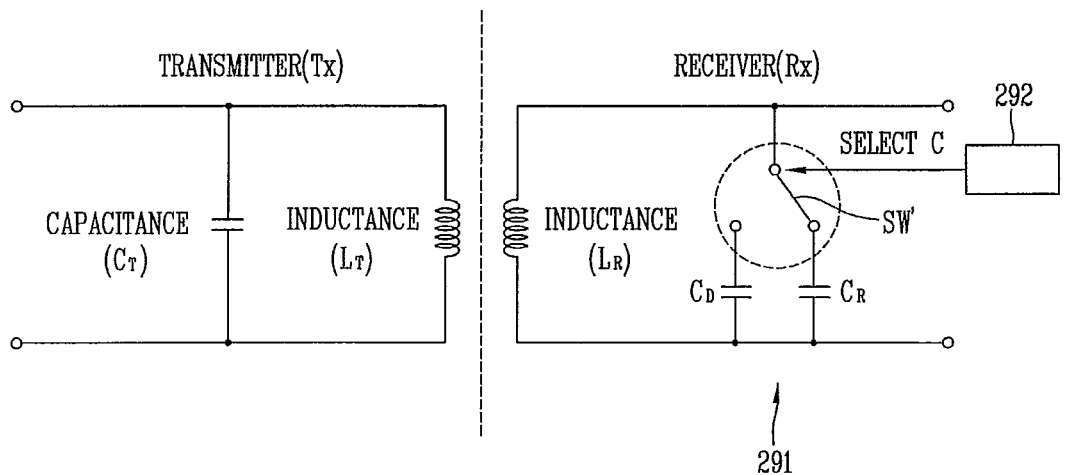
FIG. 26 is an exemplary view illustrating a wireless power system in accordance with a third exemplary embodiment.

FIG. 26 is an exemplary view illustrating a wireless power system in accordance with a third exemplary embodiment.

As illustrated in FIG. 26, the wireless power system may include a transmitting side resonant circuit of a wireless power transmitter, and a receiving side resonant circuit of a wireless power receiver.

Resonance type transmitting and receiving circuits (or the transmitting side resonant circuit and the receiving side resonant circuit), as illustrated in FIG. 26, may include at least one inductor and at least one capacitor.

The receiving side resonant circuit may be a constituent element, which is included or corresponds to the power receiving unit 291.

In accordance with the third exemplary embodiment, the power receiving unit (or receiving side resonant circuit) 291 may include a first capacitor $C_D$, a second capacitor $C_R$, an inductor $L_R$ and a switching device SW'.

Here, the power reception control unit 292 may control the power receiving unit 291 to selectively connect one of the first capacitor $C_D$ and the second capacitor $C_R$ to the inductor $L_R$ in response to a switching operation of the switching device SW', changing a resonant frequency corresponding to the wireless power signal.

For example, the power reception control unit 292 may control the power receiving unit 291 to connect one of the first capacitor $C_D$ and the second capacitor $C_R$ to the inductor $L_R$ in parallel to each other in response to the switching operation of the switching device SW'.

Here, the first capacitor $C_D$ may be a detection capacitor for the wireless power transmitter (Tx) 100 to detect the wireless power receiver 200, and the second capacitor $C_R$ may be a resonance capacitor for wirelessly receiving power transmitted (generated) based on a resonance phenomenon.

The selective connection of the first capacitor $C_D$ and the second capacitor $C_R$ to the inductor $L_R$ may be relevant to a change of an operating mode of the wireless power receiver 200.

For example, when the first capacitor $C_D$ is connected to the inductor $L_R$, the wireless power receiver 200 may operate in the detection mode.

As another example, when the second capacitor $C_R$ is connected to the inductor $L_R$, the wireless power receiver 200 may operate in the charging mode.

The detection mode may be a mode that the wireless power receiver 200 receives a wireless power signal with a first resonant frequency, which is a resonant frequency corresponding to the resonant circuit formed by the connection between the first capacitor $C_D$ and the inductor $L_R$. Here, the wireless power transmitter 100 may detect the presence of the wireless power receiver 200. A detailed detection method will be understood by the aforementioned description.

The charging mode may be a mode that the wireless power receiver 200 receives a wireless power signal with a second resonant frequency, which is a resonant frequency corresponding to the resonant circuit formed by the connection between the second capacitor $C_R$ and the inductor $L_R$. Here, the wireless power receiver 200 may receive (be charged with) power in a wireless manner based on the reception of the wireless power signal.

Hereinafter, detailed description will be given of the method for changing the resonant frequency according to the third exemplary embodiment. When a new wireless power receiver enters a specific area (for example, an activation area, a detection area or a charging area), the new wireless power receiver may operate by changing a physical connection between passive devices (for example, inductors or capacitors) included in the receiving side resonant circuit based on steps (or based on a mode, for example, based on a detection mode or charging mode).

Even if the existing wireless power receiver is already being charged, the new wireless power receiver may have a different configuration of inductor (L)-capacitor (C), which is a step of being recognized by the wireless power transmitter, from the existing wireless power receiver.

Therefore, since the new wireless power receiver has a resonant frequency different from that of the existing wireless power receiver, a strong resonant coupling may not occur, unlike the resonant frequency at which the charging is ongoing, but a coupling may merely occur as strong as driving only the power reception control unit (or MCU) of the new wireless power receiver. In this sense, the detection mode may be a concept including a wake-up mode.

Afterwards, the new wireless power receiver requests for adjustment of a required amount of power from the wireless power transmitter in a recognition mode (or the detection mode). When the new wireless power receiver meets a chargeable condition, the new wireless power receiver may be converted into the charging mode by changing the physical connection between the passive devices included in the L-C circuit (or the receiving side resonant circuit).

Hereinafter, description will be given of an operation of the wireless power receiver according to an operating mode with reference to FIG. 27.

FIG. 27 is an exemplary view illustrating a resonant frequency changing method by a receiving side resonant circuit in accordance with a third exemplary embodiment.

As illustrated in FIG. 27, it can be understood that the wireless power transmitter 100 is transmitting power to a first wireless power receiver 200a in a wireless manner.

Here, the first wireless power receiver 200a may operate in a charging mode (or a wireless power receiving mode), and a charging capacitor $C_{Ra}$ may be connected to an inductor $L_{Ra}$ by a first power reception control unit 292a of the first wireless power receiver 200a.

The wireless power receiving mode (or the charging mode) may be an operating mode in which the wireless power transmitter 100 generates a wireless power signal and the wireless power receiver receives power transferred in a wireless manner by receiving the wireless power signal.

Afterwards, when a second wireless power receiver 200b meets a specific condition, a second power reception control unit 292b may selectively connect a first capacitor (or detection capacitor) $C_{Db}$ to an inductor $L_{Rb}$.

Also, after the second wireless power receiver 200b meets the specific condition, when a receiving side voltage of the second wireless power receiver 200b is close to a reference voltage within a specific error range, the second power reception control unit 292b may selectively connect a second capacitor (or resonance capacitor) $C_{Rb}$ to the inductor $L_{Rb}$.

Here, the reference voltage may be decided based on whether it is a voltage that is able to cause damage on the second wireless power receiver 200b.

Also, the specific error range may be ±5% of the reference voltage.

The specific condition may indicate a case where the wireless power receiver is located within a specific area, a case where a new wireless power receiver is located within the specific area, a case where the number of wireless power receivers present within the specific area changes, a case where a position of at least one wireless power receiver present within the specific area changes, or a case of receiving a request periodically or from the wireless power receiver.

Also, the specific area may be an area where the wireless power signal passes through or an area where the wireless power receiver can be detected (an activation area, a detection area or a charging area).

In FIG. 27, the specific condition may correspond to the case where the second wireless power receiver 200b newly enters the specific area.

In detail, referring to FIG. 27, when the second wireless power receiver 200b newly enters an activation area, detection area or charging area (indicating a charging available area), the second power reception control unit 292b of the second wireless power receiver 200b may connect the detection capacitor (or the first capacitor) $C_a$ to the inductor $L_{Rb}$ at the beginning of the entry (or such connection may be preset as an initial condition of the second wireless power receiver).

Here, a second power receiving unit 291b may operate with a first resonant frequency, and accordingly the wireless power transmitter 100 may detect the second wireless power receiver 200b. This operating mode may be referred to as a detection mode.

The detection of the second wireless power receiver 200b by the wireless power transmitter 100 may be performed in various manners. For example, the power transmission control unit 112 may detect presence of the second wireless power receiver 200b by monitoring whether or not a characteristic of a wireless power signal generated by the power conversion unit 111 is changed due to being affected by the second wireless power receiver 200b present in a detection area. Here, the activation area and the detection area may depend on a wireless power transferring method such as the inductive coupling and the resonance coupling.

Also, the wireless power transmitter 100 may detect the second wireless power receiver 200b by receiving a control message transmitted from the second wireless power receiver 200b via a first resonant frequency. The control message may be transmitted by modulation for the wireless power signal performed by the second wireless power receiver 200b.

While the second wireless power receiver 200b operates in the detection mode, the wireless power transmitter 100 may generate a wireless power signal based on a carrier signal, and operate in a resonant frequency deciding mode when the second wireless power receiver 200b meets the specific condition (for example, entering the specific area).

The resonant frequency deciding mode may be an operating mode of sequentially changing power wirelessly transferred based on the wireless power signal by sequentially changing a driving frequency of the carrier signal, and deciding a driving frequency corresponding to a receiving side voltage of the second wireless power receiver 200b as a resonant frequency when the receiving side voltage is close to the reference voltage within the specific error range due to the changed wireless power.

In accordance with the third exemplary embodiment, the second power reception control unit 292a may control the second power receiving unit 291b to transmit a control message to the wireless power transmitter 100.

Here, the wireless power transmitter 100 may sequentially change the driving frequency based on the transmitted control message.

Here, the control message may include control error information indicating a voltage difference between the receiving side voltage of the second wireless power receiver 200b and the reference voltage corresponding to the second wireless power receiver 200b.

Also, in accordance with the third exemplary embodiment, the wireless power transmitter 100 may decide whether or not the receiving side voltage is close to the reference voltage within a specific error range based on the control message, and terminate the change of the driving frequency when the receiving side voltage is close to the reference voltage within the specific error range.

When the receiving side voltage is close to the reference voltage within the specific error range, the charging capacitor $C_{Rb}$ may be connected to the inductor $L_{Rb}$ by the second power reception control unit 292b of the second wireless power receiver 200b, accordingly, the second power receiving unit 291a may operate with a second resonant frequency.

Therefore, the second wireless power receiver 200b may enter the charging mode to receive power wirelessly via the second resonant frequency.

Here, when the receiving side voltage is close to the reference voltage within the specific error range (or when the second wireless power receiver 200b enters the charging mode), the wireless power transmitter 100 may change the connection between the at least one inductor and the at least one capacitor included in the transmitting side resonant circuit included in the wireless power transmitter 100 so as to correspond to the second resonant frequency.

Figure 28:
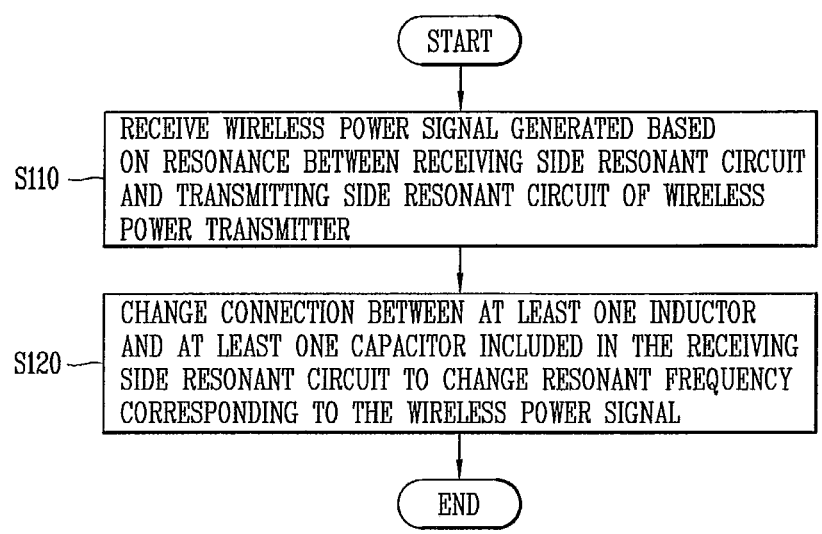
FIG. 28 is a flowchart illustrating a resonant frequency changing method in accordance with a third exemplary embodiment.

FIG. 28 is a flowchart illustrating a resonant frequency changing method in accordance with a third exemplary embodiment.

As illustrated in FIG. 28, a method for changing a resonant frequency according to a third exemplary embodiment may include the following steps.

In a resonant frequency changing method for a wireless power receiver including a receiving side resonant circuit provided with at least one inductor and at least one capacitor, the wireless power receiver may receive a wireless power signal, which is generated based on a resonance phenomenon between the receiving side resonant circuit and a transmitting side resonant circuit of a wireless power transmitter (S110).

The wireless power transmitter may change a resonant frequency corresponding to the wireless power signal by changing a connection between the at least one inductor and the at least one capacitor (S120).

Figure 29:
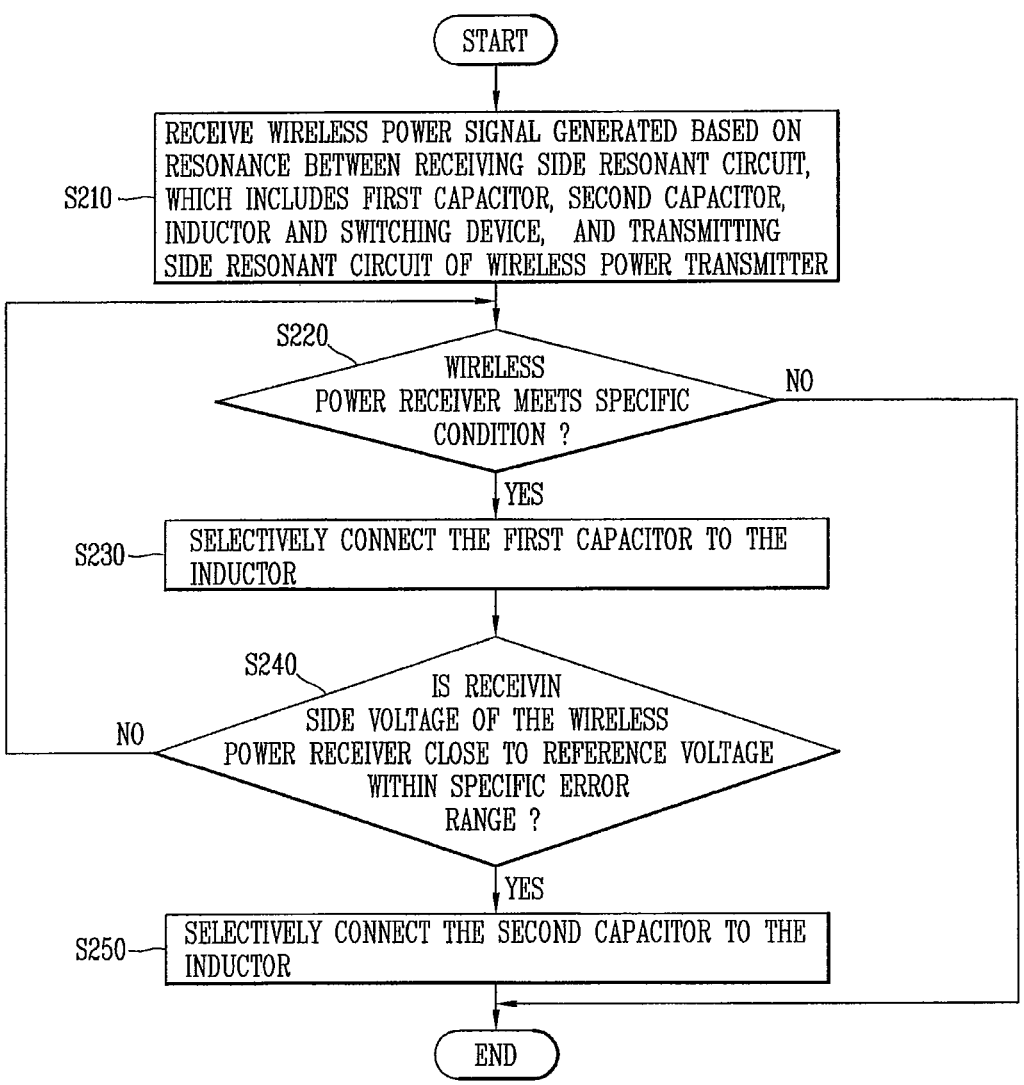
FIG. 29 is a flowchart illustrating a resonant frequency changing method in accordance with another third exemplary embodiment.

FIG. 29 is a flowchart illustrating a resonant frequency changing method in accordance with another third exemplary embodiment.

As illustrated in FIG. 29, a method for changing a resonant frequency according to another third exemplary embodiment may include the following steps.

First, a wireless power receiver may receive a wireless power signal, which is generated based on a resonance phenomenon between a receiving side resonant circuit, which includes a first capacitor, a second capacitor, an inductor and a switching device, and a transmitting side resonant circuit of a wireless power transmitter (S210).

The wireless power receiver may determine whether or not it meets a specific condition (S220).

Upon meeting the specific condition, the wireless power receiver may selectively connect the first capacitor to the inductor (S230).

The wireless power receiver may then determine whether or not a receiving side voltage thereof is close to a reference voltage within a specific error range (S240).

When the receiving side voltage of the wireless power receiver is close to the reference voltage within the specific error range, the wireless power receiver may selectively connect the second capacitor to the inductor (S250).

As described above, in accordance with a wireless power system and a resonant frequency changing method thereof in accordance with exemplary embodiments, a resonant frequency of a resonant circuit included in a wireless power receiver or a wireless power transmitter, which constitutes the wireless power system, may be adjusted by changing a physical connection between passive devices included in the resonant circuit, acquiring high transmission efficiency regardless of the change in wireless power transfer environments.

The foregoing method may be implemented in a recording medium readable by a computer or its similar devices by employing, for example, software, hardware or some combinations thereof.

For a hardware implementation, the embodiments described herein may be implemented by using at least any one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein. For example, the foregoing methods may be implemented by the control unit (or Controller) 180 or power transmission control unit 112 in the wireless power transmitter 100, or implemented by the controller 280 or Power reception control unit (or POWER RECEIVING CONTROL UNIT) 292 in the electronic device 200.

For a software implementation, the embodiments such as procedures and functions disclosed herein may be implemented with separate software modules. Each of the software modules may perform one or more of the functions and operations described herein. Software codes may be implemented by using a software application written in a suitable programming language. The software codes may be stored in the memory 150 in the wireless power transmitter 100, and implemented by the control unit (or Controller) 180 or the power transmission control unit 112, and similarly, stored in the memory 260 in the electronic device 200, and implemented by the controller 280 or the Power reception control unit (or POWER RECEIVING CONTROL UNIT) 292.

The scope of the invention will not be limited to the embodiments disclosed herein, and thus various modifications, variations, and improvements can be made in the present invention without departing from the spirit of the invention, and within the scope of the appended claims.

What is claimed is:

1. A wireless power receiver comprising:
a power receiving unit having a receiving side resonant circuit provided with at least one inductor and at least one capacitor, and configured to receive a wireless power signal, the wireless power signal being generated based on a resonance phenomenon between the receiving side resonant circuit and a transmitting side resonant circuit of a wireless power transmitter; and
a power reception control unit configured to control the power receiving unit to change a connection between the at least one inductor and the at least one capacitor so as to change a resonant frequency corresponding to the wireless power signal, wherein the power receiving unit comprises:
a first capacitor;
a second capacitor;
an inductor; and
a switching device,
wherein the power receiving unit is configured to selectively connect either the first capacitor or the second capacitor to the inductor in response to a switching operation of the switching device so as to change the resonant frequency corresponding to the wireless power signal,
wherein the first capacitor is a detection capacitor configured to connect to the inductor to have the power receiving unit to operate in a first resonant frequency when the wireless power receiver meets a specific condition,
wherein the first resonant frequency is preconfigured to generate a resonant coupling between the receiving side resonant circuit and the transmitting side resonant circuit strong enough to wake up and drive the power reception control unit and prevent the wireless power signal from damaging the wireless power receiver, and
wherein the second capacitor is a resonance capacitor configured to connect to the inductor to wirelessly receive power and charge the wireless power receiver in a second resonant frequency from the wireless power transmitter based on the resonance phenomenon when a receiving side voltage of the wireless power receiver is close to a reference voltage within a specific error range after meeting the specific condition.

2. The receiver of claim 1, wherein at least one of the first capacitor or the second capacitor comprises n capacitors, and the switching device comprises n switching devices, and
wherein the power reception control unit controls the power receiving unit to selectively connect at least one of the n capacitors to the inductor in parallel to each other in response to the switching operation of the switching device.

3. The receiver of claim 1, wherein the inductor comprises n inductors, and the switching device comprises n switching devices, and
wherein the power reception control unit controls the power receiving unit to selectively connect at least one of the n inductors to either the first capacitor or the second capacitor in series in response to the switching operation of the switching device.

4. The receiver of claim 1, wherein the reference voltage is decided based on whether or not it is a voltage which is able to cause damage on the wireless power receiver.

5. The receiver of claim 1, wherein the wireless power transmitter generates a wireless power signal based on a carrier signal, and operates in a resonant frequency deciding mode when the wireless power receiver meets the specific condition, and
wherein the resonant frequency deciding mode is a mode of sequentially changing power transmitted in a wireless manner based on the wireless power signal by sequentially changing a driving frequency of the carrier signal, and deciding a driving frequency corresponding to the receiving side voltage as a resonant frequency when the receiving side voltage is close to the reference voltage within the specific error range due to the changed wireless power.

6. The receiver of claim 1, wherein the specific error range is ±5% of the reference voltage.

7. The receiver of claim 5, wherein the specific condition indicates a case where the wireless power receiver is located within a specific area, a case where a new wireless power receiver is located within the specific area, a case where the number of wireless power receivers present within the specific area changes, a case where a position of at least one wireless power receiver present within the specific area changes, or a case of receiving a request periodically or from the wireless power receiver, and
wherein the specific area is an area where the wireless power signal passes through or an area where the wireless power receiver can be detected.

8. The receiver of claim 5, wherein the power reception control unit controls the power receiving unit to transmit a control message to the wireless power transmitter, and
wherein the wireless power transmitter sequentially changes the driving frequency based on the transmitted control message.

9. The receiver of claim 8, wherein the control message comprises control error information indicating a voltage difference between the receiving side voltage and the reference voltage.

10. The receiver of claim 8, wherein the wireless power transmitter decides whether or not the receiving side voltage is close to the reference voltage within the specific error range based on the control message, and terminates the change of the driving frequency when the receiving side voltage is close to the reference voltage based on the specific error range.

11. The receiver of claim 10, wherein the wireless power transmitter changes a connection between at least one inductor and at least one capacitor included in the transmitting side resonant circuit to correspond to the change of the resonant frequency corresponding to the wireless power signal when the receiving side voltage is close to the reference voltage within the specific error range.

12. A wireless power transmitter comprising:
a power conversion unit having a transmitting side resonant circuit provided with at least one inductor and at least one capacitor, and configured to generate a wireless power signal based on a resonance phenomenon between the transmitting side resonant circuit and a receiving side resonant circuit of a wireless power receiver; and
a power transmission control unit configured to change a connection between the at least one inductor and the at least one capacitor so as to change a resonant frequency corresponding to the wireless power signal, wherein the wireless power receiver comprises:
a first capacitor;
a second capacitor;
an inductor; and
a switching device,
wherein the inductor is selectively connected to either the first capacitor or the second capacitor in response to a switching operation of the switching device so as to change the resonant frequency corresponding to the wireless power signal,
wherein the first capacitor is a detection capacitor configured to connect to the inductor to have the wireless power receiver to operate in a first resonant frequency when the wireless power receiver meets a specific condition,
wherein the first resonant frequency is preconfigured to generate a resonant coupling between the receiving side resonant circuit and the transmitting side resonant circuit strong enough to wake up and drive the power reception control unit and prevent the wireless power signal from damaging the wireless power receiver, and
wherein the second capacitor is a resonance capacitor configured to connect to the inductor to wirelessly receive power and charge the wireless power receiver in a second resonant frequency from the wireless power transmitter based on the resonance phenomenon when a receiving side voltage of the wireless power receiver is close to a reference voltage within a specific error range after meeting the specific condition.

13. The transmitter of claim 12, wherein the power conversion unit generates the wireless power signal based on a carrier signal, and
wherein the power transmission control unit controls the power conversion unit to sequentially change a driving frequency of the carrier signal so as to sequentially change power wirelessly transmitted based on the wireless power signal when the wireless power receiver receiving power in a wireless manner based on the wireless power signal meets the specific condition, and
wherein the power transmission control unit controls the power conversion unit to terminate the sequential change of the driving frequency when the receiving side voltage of the wireless power receiver is close to the reference voltage within the specific error range by the changed wireless power.

14. The transmitter of claim 13, wherein the specific condition indicates a case where the wireless power receiver is located within a specific area, a case where a new wireless power receiver is located within the specific area, a case where the number of wireless power receivers present within the specific area changes, a case where a position of at least one wireless power receiver present within the specific area changes, or a case of receiving a request periodically or from the wireless power receiver,
wherein the specific area is an area where the wireless power signal passes through or an area where the wireless power receiver can be detected,
wherein the reference voltage is decided based on whether or not it is a voltage which is able to cause a damage on the wireless power receiver, and
wherein the specific error range is ±5% of the reference voltage.

15. A method for changing a resonant frequency in a wireless power receiver having a receiving side resonant circuit provided with at least one inductor and at least one capacitor, the method comprising:
receiving a wireless power signal generated based on a resonance phenomenon between the receiving side resonant circuit and a transmitting side resonant circuit of a wireless power transmitter; and
changing a connection between the at least one inductor and the at least one capacitor to change a resonant frequency corresponding to the wireless power signal, wherein the receiving side resonant circuit comprises:
a first capacitor;
a second capacitor;
an inductor; and
a switching device, wherein the inductor is selectively connected to either the first capacitor or the second capacitor in response to a switching operating of the switching device so as to change the resonant frequency corresponding to the wireless power signal, wherein the first capacitor is a detection capacitor configured to connect to the inductor to have the wireless power receiver to operate in a first resonant frequency when the wireless power receiver meets a specific condition, wherein the first resonant frequency is preconfigured to generate a resonant coupling between the receiving side resonant circuit and the transmitting side resonant circuit strong enough to wake up and drive the power reception control unit and prevent the wireless power signal from damaging the wireless power receiver, and wherein the second capacitor is a resonance capacitor configured to connect to the inductor to wirelessly receive power and charge the wireless power receiver in a second resonant frequency from the wireless power transmitter based on the resonance phenomenon when a receiving side voltage of the wireless power receiver is close to a reference voltage within a specific error range after meeting the specific condition.

16. The method of claim 15, wherein the specific condition indicates a case where the wireless power receiver is located within a specific area, a case where a new wireless power receiver is located within the specific area, a case where the number of wireless power receivers present within the specific area changes, a case where a position of at least one wireless power receiver present within the specific area changes, or a case of receiving a request periodically or from the wireless power receiver, wherein the specific area is an area where the wireless power signal passes through or an area where the wireless power receiver can be detected, wherein the reference voltage is decided based on whether or not it is a voltage which is able to cause a damage on the wireless power receiver, and wherein the specific error range is ±5% of the reference voltage.

* * * * *